United States Patent
Najaf-Zadeh et al.

(10) Patent No.: US 11,803,987 B2
(45) Date of Patent: Oct. 31, 2023

(54) ATTRIBUTE TRANSFER IN V-PCC

(71) Applicant: Samsung Electronics Co., Ltd., Suwon-si (KR)

(72) Inventors: Hossein Najaf-Zadeh, Allen, TX (US); Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/160,305

(22) Filed: Jan. 26, 2023

(65) Prior Publication Data
US 2023/0169693 A1    Jun. 1, 2023

Related U.S. Application Data

(63) Continuation of application No. 17/118,431, filed on Dec. 10, 2020, now Pat. No. 11,593,967.
(Continued)

(51) Int. Cl.
*H04N 13/207* (2018.01)
*G06T 9/00* (2006.01)
(Continued)

(52) U.S. Cl.
CPC .............. *G06T 9/001* (2013.01); *G06T 5/002* (2013.01); *G06T 5/006* (2013.01); *G06T 17/205* (2013.01)

(58) Field of Classification Search
CPC .......... G06T 1/0085; G06T 2201/0053; H04N 19/467; H04N 13/194; H04N 19/597; G04H 21/2351
See application file for complete search history.

(56) References Cited

U.S. PATENT DOCUMENTS

| 6,919,892 B1* | 7/2005 | Cheiky | .................. G06T 13/40 348/E5.022 |
| 7,027,054 B1* | 4/2006 | Cheiky | .................. H04N 5/262 345/473 |

(Continued)

FOREIGN PATENT DOCUMENTS

WO    2020005364 A1    1/2020

OTHER PUBLICATIONS

International Search Report and Written Opinion of the International Searching Authority in connection with International Application No. PCT/KR2021/000175 dated Apr. 8, 2021, 7 pages.
(Continued)

*Primary Examiner* — Yosef Kassa

(57) ABSTRACT

A method for point cloud decoding includes receiving a bitstream. The method also includes decoding the bitstream into multiple frames that include pixels. Certain pixels of the multiple frames correspond to points of a three-dimensional (3D) point cloud. The multiple frames include a first set of frames that represent locations of the points of the 3D point cloud and a second set of frames that represent attribute information for the points of the 3D point cloud. The method further includes reconstructing the 3D point cloud based on the first set of frames. Additionally, the method includes identifying a first portion of the points of the reconstructed 3D point cloud based at least in part on a property associated with the multiple frames. The method also includes modifying a portion of the attribute information. The portion of the attribute information that is modified corresponds to the first portion of the points.

20 Claims, 22 Drawing Sheets

Related U.S. Application Data

(60) Provisional application No. 63/010,996, filed on Apr. 16, 2020, provisional application No. 62/988,071, filed on Mar. 11, 2020, provisional application No. 62/986,413, filed on Mar. 6, 2020, provisional application No. 62/981,855, filed on Feb. 26, 2020, provisional application No. 62/958,459, filed on Jan. 8, 2020, provisional application No. 62/958,497, filed on Jan. 8, 2020.

(51) Int. Cl.
*G06T 5/00* (2006.01)
*G06T 17/20* (2006.01)

(56) References Cited

U.S. PATENT DOCUMENTS

| | | | | |
|---|---|---|---|---|
| 8,107,599 | B2* | 1/2012 | Topiwala | G06Q 10/107 |
| | | | | 379/88.17 |
| 8,300,881 | B2* | 10/2012 | Chen | H04N 19/467 |
| | | | | 382/154 |
| 8,391,686 | B2 | 3/2013 | Oshima | |
| 8,553,037 | B2* | 10/2013 | Smith | G06T 13/40 |
| | | | | 345/473 |
| 9,094,615 | B2 | 7/2015 | Aman | |
| 9,094,668 | B2* | 7/2015 | Kanemaru | H04N 9/8211 |
| 9,565,419 | B2 | 2/2017 | Presler | |
| 2014/0355843 | A1 | 12/2014 | Da | |
| 2016/0086353 | A1 | 3/2016 | Lukac | |
| 2017/0214943 | A1 | 7/2017 | Cohen | |

OTHER PUBLICATIONS

3DG, "V-PCC Codec Description," ISO/IEC JTC 1/SC 29/WG 11, N 18892, Coding of moving pictures and audio, UNI (Italy), Nov. 22, 2019, 65 pages.

3DG, "Text of ISO/IEC DIS 23090-5 Video-Based Point Cloud Compression," The International Organization for Standardization, Coding of moving picturesand audio, ISO/IEC JTC 1/SC29/WG 11, N18670, Vernier, Geneva, Oct. 10, 2019, 185 pages.

Technicolor, "[V-PCC][NEW] Patch border filtering," International Organisation for Standardisation Organisation Internationale De Normalisation, Coding of Moving Pictures and Audio, ISO/IEC JTC1/SC29/WG11, Geneva, Switzerland, Mar. 2019, 6 pages.

Extended European Search Report dated Dec. 14, 2022 regarding Application No. 21738842.0, 6 pages.

Mehlem et al., "Smoothing considerations for V-PCC", ISO/IEC JTC1/SC29/WG11 MPEG2019/m51023, Oct. 2019, 13 pages.

\* cited by examiner

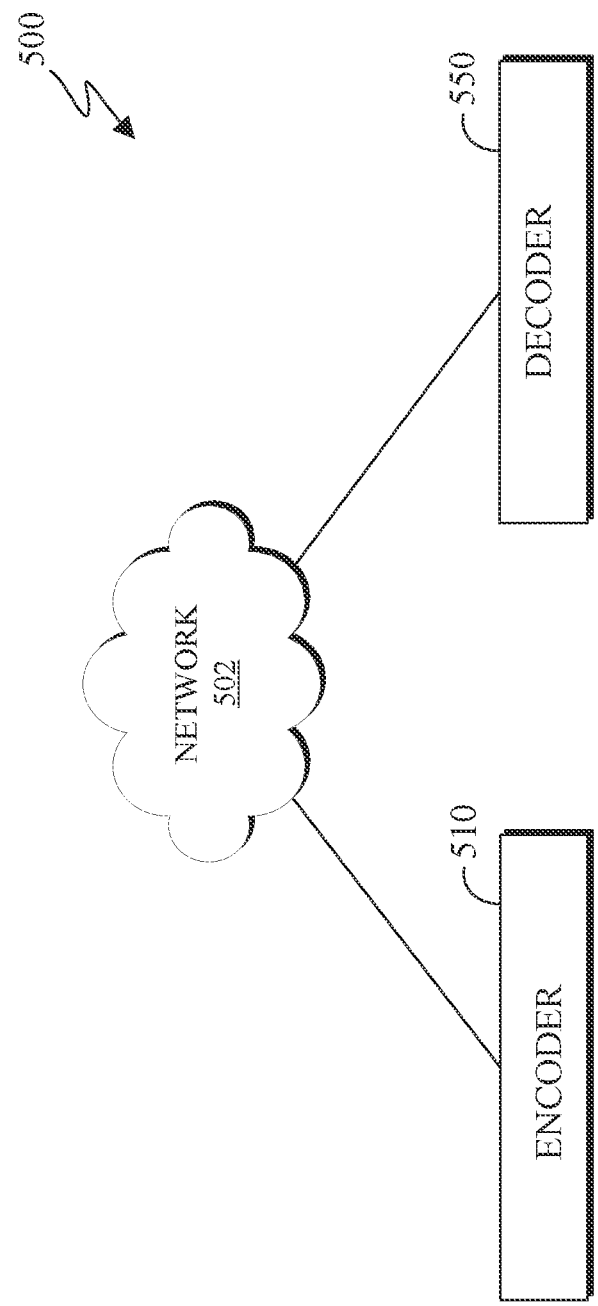

ATTRIBUTE TRANSFER IN V-PCC

CROSS-REFERENCE TO RELATED APPLICATION AND CLAIM OF PRIORITY

This application is a continuation of U.S. patent application Ser. No. 17/118,431, filed on Dec. 10, 2020, which claims priority under 35 U.S.C. § 119(e) to:
  (i) U.S. Provisional Patent Application No. 62/958,459 filed on Jan. 8, 2020;
  (ii) U.S. Provisional Patent Application No. 62/958,497 filed on Jan. 8, 2020;
  (iii) U.S. Provisional Patent Application No. 62/981,855 filed on Feb. 26, 2020;
  (iv) U.S. Provisional Patent Application No. 62/986,413 filed on Mar. 6, 2020;
  (v) U.S. Provisional Patent Application No. 62/988,071 filed on Mar. 11, 2020; and
  (vi) U.S. Provisional Patent Application No. 63/010,996 filed on Apr. 16, 2020.
The above-identified provisional patent applications are hereby incorporated by reference in their entirety.

TECHNICAL FIELD

This disclosure relates generally to multimedia data. More specifically, this disclosure relates to method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Point clouds are a set of points in 3D space that represent an object. Point clouds are common in a variety of applications such as gaming, 3D maps, visualizations, medical applications, augmented reality, virtual reality, autonomous driving, multi-view replay, 6 degrees of freedom (6DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) frames that can be compressed and reconstructed on a different device in order to be viewed by a user.

SUMMARY

This disclosure provides an attribute transfer in V-PCC.

In one embodiment, a decoding device for point cloud decoding is provided. The decoding device includes a communication interface and a processor. The communication interface is configured to receive a bitstream. The processor is configured to decode the bitstream into multiple frames that include pixels, wherein certain pixels of the multiple frames correspond to points of a three-dimensional (3D) point cloud. The multiple frames include a first set of frames that represent locations of the points of the 3D point cloud and a second set of frames that represent attribute information for the points of the 3D point cloud. The processor is configured to reconstruct the 3D point cloud based on the first set of frames. The processor is configured to identify a first portion of the points of the reconstructed 3D point cloud based at least in part on a property associated with the multiple frames. The processor is configured to modify a portion of the attribute information. The portion of the attribute information that is modified corresponds to the first portion of the points.

In another embodiment, a method for point cloud decoding is provided. The method includes receiving a bitstream. The method also includes decoding the bitstream into multiple frames that include pixels, wherein certain pixels of the multiple frames correspond to points of a three-dimensional (3D) point cloud. The multiple frames include (i) a first set of frames that represent locations of the points of the 3D point cloud and (ii) a second set of frames that represent attribute information for the points of the 3D point cloud. The method further includes reconstructing the 3D point cloud based on the first set of frames. Additionally, the method includes identifying a first portion of the points of the reconstructed 3D point cloud based at least in part on a property associated with the multiple frames. The method also includes modifying a portion of the attribute information. The portion of the attribute information that is corresponds to the first portion of the points.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5A illustrates a block diagram of an example environment-architecture in accordance with an embodiment of this disclosure;

DETAILED DESCRIPTION

Figure 1:
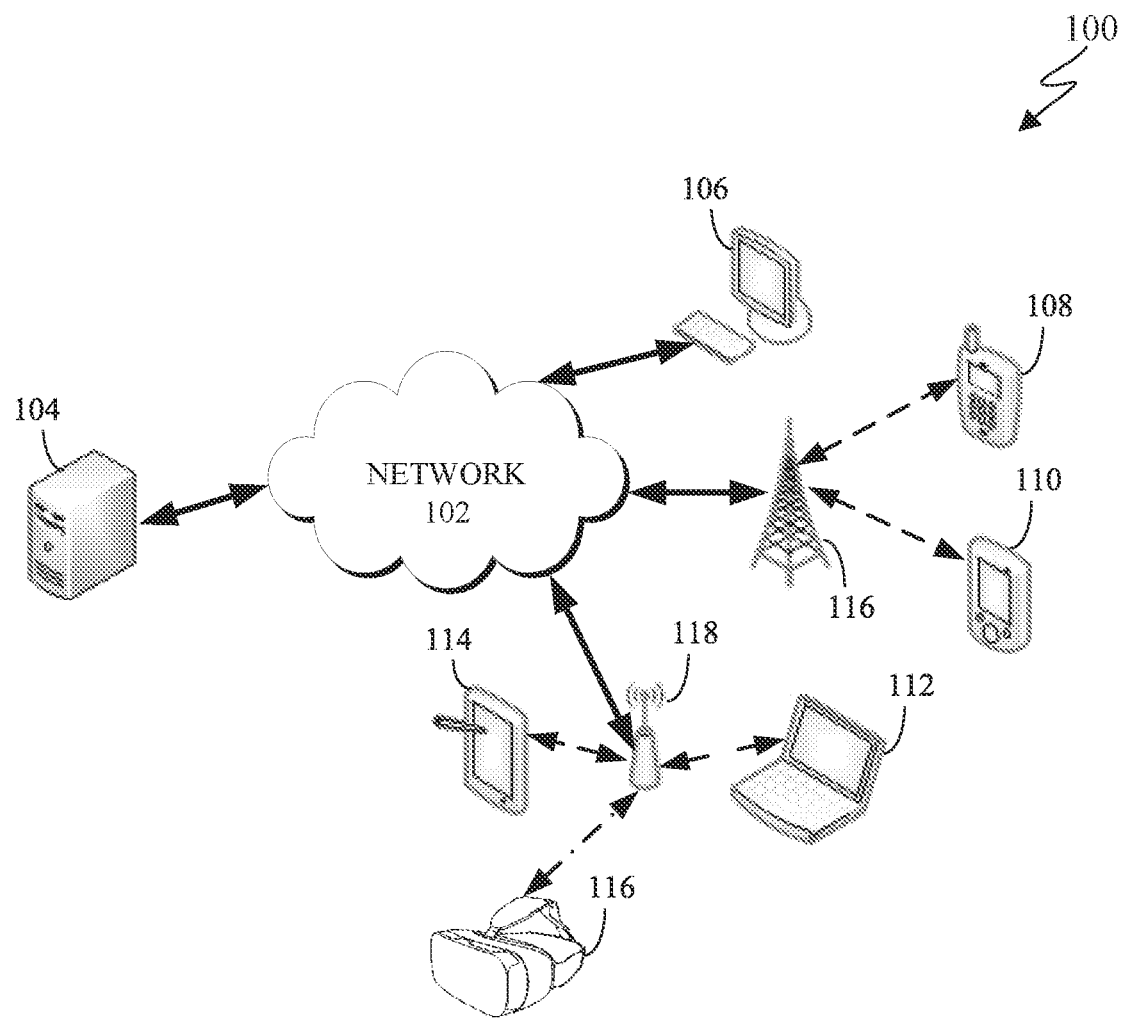
FIG. 1 illustrates an example communication system in accordance with an embodiment of this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to detected head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned at a particular geometric location within 3D space. In addition to a point having a geometric location, the points can include zero or more attributes (such as color, texture, reflectance, intensity, normal, material properties, motion, and the like). A point cloud can be similar to a virtual object in a VR or AR environment. A mesh is another type of a virtual representation of an object in a VR or AR environment. A point cloud or a mesh can be an object, multiple objects, a virtual scene (which includes multiple objects), and the like. Point clouds and meshes are commonly used in a variety of applications, including gaming, 3D mapping, visualization, medicine, AR, VR, autonomous driving, multi-view replay, 6 DoF immersive media, to name a few. As used herein, the terms point clouds and meshes can be used interchangeably.

Point clouds represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object.

In addition to the geometric position of a point (the location of the point in 3D space), each point in the point cloud can also include one or more attributes such as color, texture, reflectance, intensity, surface normal, and the like. In some embodiments, a single point of a 3D point cloud can have no attributes. In other embodiments a single point of a 3D point cloud can have one or more attributes. In some applications, point clouds can also be used to approximate light field data in which, each point includes multiple view-dependent, color information (R, G, B or Y, U, V triplets).

A single point cloud can include billions of points, with each point associated with a geometric position and zero or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points (and each point includes geometric attribute data and color attribute data), the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to render and display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point cloud is necessary to reduce the volume of data (bandwidth) that is used when a point cloud is transmitted from one device (such as a source device) to another device (such as a display device or user device). Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D representation to a 2D representation.

Embodiments of the present disclosure provide systems and methods for converting an input 3D point cloud into a 2D representation that can be transmitted and then reconstructed into the 3D point cloud for rendering. An encoder converts an input 3D a point cloud onto multiple 2D frames (such as geometry frames, attribute frames, and occupancy map frames), which can be encoded (using video codecs such as HEVC, AVC, VP9, VP8, VVC, and the like to compress the 2D similar to a 2D video) for transmission via a bitstream. A decoder receives and decodes the bitstream and then reconstructs the 3D point cloud from the 2D frames such that the 3D point cloud can be rendered, displayed, and then viewed by a user.

In certain embodiments, a point cloud is deconstructed from a 3D state into multiple patches which are packed into the 2D frames. The points of the 3D point cloud that are represented in one patch in a first frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

To deconstruct a 3D point cloud for transmission from one device to another, the geometric positions of the points of the point cloud are separated from the attribute information of the points. Projections of the 3D point cloud are made with respect to different projection planes, such that the 3D point cloud is separated into multiple clusters of points which are represented as patches on 2D frames. A first set of frames can include values representing geometry positions of the points. Each additional set of frames can represent different attributes of the point cloud. For example, one attribute frame can include values representing color information associated with each of the points. The patches representing the geometry and attribute information are packed into geometry video frames and attribute video frames, respectively, where each pixel within any of the patches corresponds to a point in 3D space. The geometry video frames are used to encode the geometry information, and each of the corresponding attribute video frames are used to encode the attribute (such as color) of the point cloud.

Figure 4A:
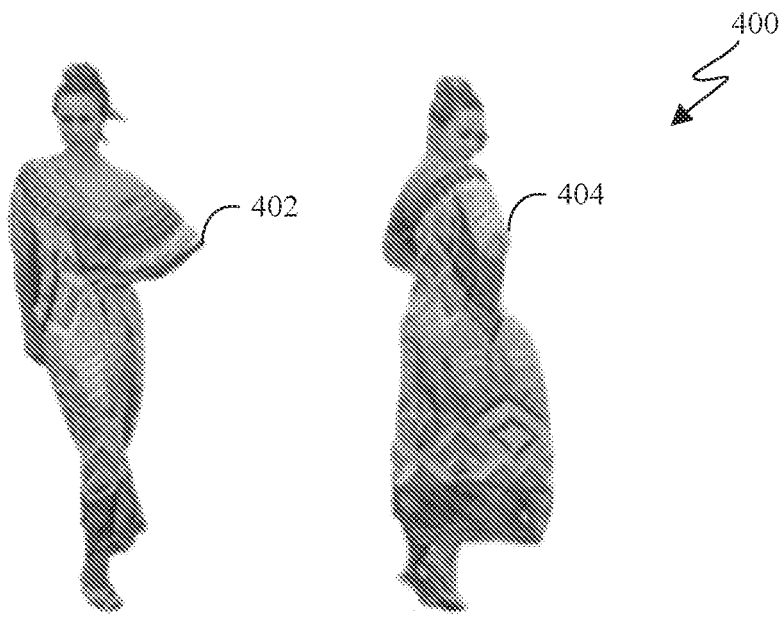
FIG. 4A illustrates an example 3D point cloud in accordance with an embodiment of this disclosure.
Figure 4B:
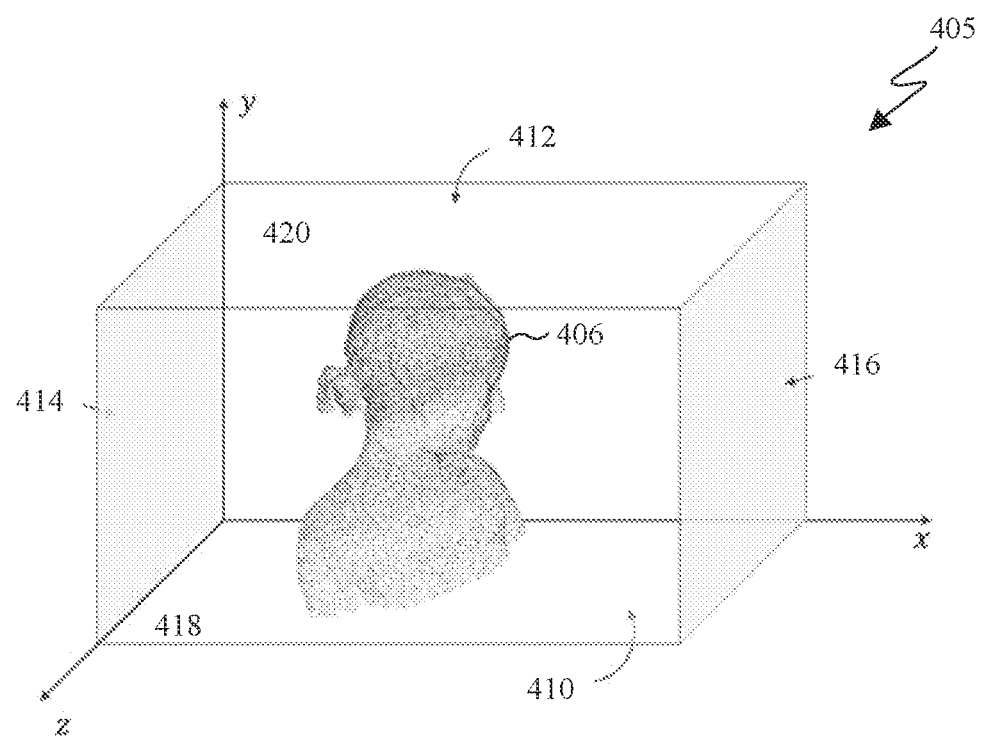
FIG. 4B illustrates a diagram of a point cloud that is surrounded by multiple projection planes in accordance with an embodiment of this disclosure.
Figure 4C:
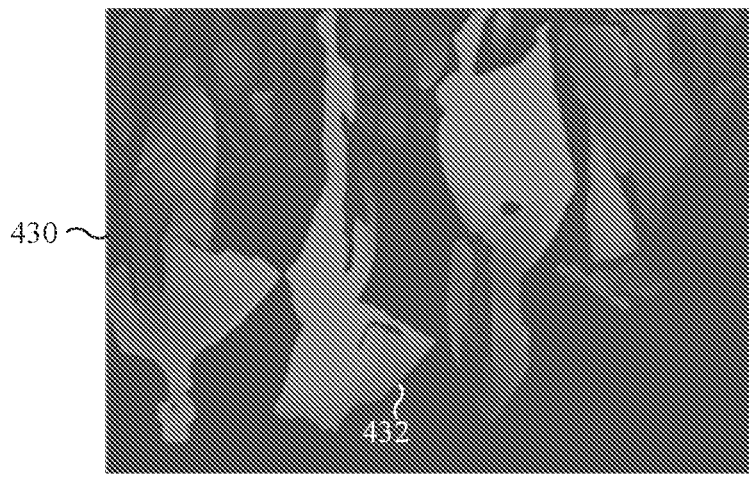
FIGS. 4C and 4D illustrate example 2D frames that include patches representing the 3D point cloud of FIG. 4A in accordance with an embodiment of this disclosure.
Figure 4D:
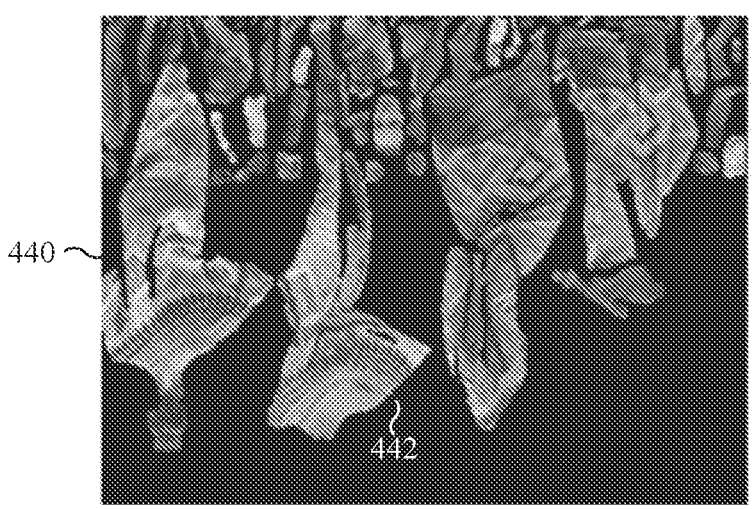

When the point cloud is deconstructed to fit on multiple 2D frames and compressed, the frames can be transmitted using less bandwidth than used to transmit the original point cloud. FIGS. 4A-4D, which are described in greater detail below, illustrate various stages of projecting a point cloud onto different plans and thereafter storing the projections into 2D frames. For example, FIG. 4A, illustrates a two views of a 3D point cloud, illustrating that a point cloud can be a 360° view of an object. FIG. 4B illustrates the process of projecting a 3D point cloud onto different planes. After the point cloud, such as the point cloud of FIG. 4A is projected onto different planes, FIGS. 4C and 4D illustrate a geometry frame and an attribute frame (which represents the color of the points of the 3D point cloud), respectively, which include patches corresponding to the various projections.

The geometry and attributes of an input point cloud are clustered (using some criteria such as normal direction, distance to projected frames, contiguity etc.) and are projected onto different planes (e.g. XY, YZ, ZX plane). Furthermore, for each projection plane, the points may be projected to a near plane or a far plane. FIG. 4B, discussed in greater detail below, describes the projection planes. Each of the clusters shows up as a patch when projected on a plane. The patches are sorted and packed into 2D video frame(s) storing the geometry. In certain embodiments, there may be zero or more attribute frames associated with each geometry frame. The 2D plane in which the patches are packed is referred to as a canvas. Since there could be multiple points being projected to the same pixel on the canvas, two (or more) maps are considered for patch projection. In case of multiple maps, for each map, a geometry video is formed. Similarly for each map and each attribute, an attribute video is formed. Each video is then encoded with a video codec such as HEVC, AVC, VP9, VP8, JVET, AVC or the like.

The geometry video frames are used to encode the geometry coordinates of the points of the 3D point cloud. A location (u, v) of a pixel in the geometry frame corresponds to a (X, Y, Z) location of a point in 3D space. For example, the two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

The encoder can also generate an occupancy map (also referred to an occupancy map frame). The occupancy map shows the location of projected points in the 2D videos frames. For each canvas, there is a single occupancy map that is shared by all the maps. For each pixel on the canvas, the occupancy map specifies whether that pixel is occupied, that is, whether it is part of a patch. The occupancy map shows the location of projected points in the 2D videos frames. For example, since the patches may not occupy the entirety of the generated frames, the occupancy map indicates which pixels of the geometry frame and attribute frame correspond to a point of the point cloud and which pixels are empty/invalid and do not correspond to a point of the point cloud. In certain embodiments, the occupancy map frame is compressed.

After generating the geometry frames and the occupancy map frames, the frames can be compressed by leveraging various video compression codecs, image compression codecs, or both. For example, the encoder first generates and then compresses the geometry frames using a 2D video codec such as HEVC. In certain embodiments, the encoder also encodes the occupancy map frames. In certain embodiments, the encoder can smooth the geometry of the reconstructed point cloud. It is noted that based on whether the encoder smooths the geometry of the reconstructed point cloud affects how the decoder reconstructs the 3D point cloud.

To generate an attribute frame (such as the color of the 3D point cloud), the encoder decodes the encoded geometry frame (and the occupancy map frames if they were encoded) and reconstructs the 3D coordinates of the 3D point cloud. In certain embodiments, the encoder can choose to use smoothed geometry or the reconstructed geometry to generate the attribute video. Regardless of whether the encoder uses the smoothed geometry or the reconstructed geometry to generate the attribute video, the encoder may interpolate the color values of each point from the color values of original point cloud to the corresponding geometry points of the smoothed geometry or the reconstructed geometry. The interpolated color values are then packed into a color frame which is compressed. Accordingly, the geometry video frames are used to encode the geometry information, and the corresponding attribute video frames are used to encode the attribute (such as color) of the point cloud.

For example, after the geometry frames and occupancy maps are formed, they are coded using a video codec such as HEVC. The geometry frames (and occupancy map videos if they were previously encoded) are decompressed. The encoder then reconstructs the geometry of the 3D point cloud using the decoded geometry frames and the occupancy map video frames. The attribute video frames are generated using the occupancy map frames, the input point cloud, and patch information and either the reconstructed geometry of the 3D point cloud or the smoothed geometry.

According to embodiments of the present disclosure, during the attribute generation step, an attribute transfer step is performed based on the original point cloud attributes and either the reconstructed geometry or the smoothed geometry. It is noted that since a color is a specific type of attribute, the term 'attribute transfer' can be used interchangeably with the term 'color transfer.' The attribute video is also coded using a video codec such as HEVC. Thereafter, the patch substream, occupancy map substream, geometry substream, and attribute substream are written to a bitstream. It is noted that the terms "bitstream," "sub-bitstream," and "substream" may be used interchangeably in the disclosure. Geometry smoothing parameters and attribute smoothing parameters can also be written to the bitstream.

The compressed geometry frames, the compressed color frames (and any other attribute frame), and the occupancy map frame can be multiplexed to generate a bitstream. The encoder or another device then transmits the bitstream that includes the 2D frames to a different device.

A decoder receives the bitstream, decompresses the bitstream into the frames, and reconstructs the point cloud based on the information within the frames. After the point cloud is reconstructed, the 3D point cloud can be smoothed to improve the visual quality of the 3D point cloud. Thereafter the reconstructed 3D point can be rendered and displayed for a user to observe.

For example, the decoder can receive the bitstream and identifies from the bitstream a patch substream, an occupancy map substream, a geometry substream, and an attribute substream. The decoder can also parse geometry smoothing parameters and attribute smoothing parameters if present in the bitstream. The substreams are decompressed to create reconstructed patch information frames, occupancy map frames, geometry frames, and attribute frames. Following this, the three-dimensional points and their associated attributes are reconstructed using reconstructed geometry and attributes. If geometry smoothing is enabled, the coordinates of the points are adjusted by performing geometry smoothing. When the geometry smoothing is enabled and the attribute frames were generated from the reconstructed geometry (and not the smoothed geometry), then an attribute transfer step is also performed to derive the attribute values that are better matched to the smoothed point positions. Finally, if attribute smoothing is enabled, the newly derived attribute values are smoothed.

Depending on how the encoder generates the attribute frames (such as based on the reconstructed geometry or the smoothed geometry) controls how the decoder reconstructs the point cloud. As described above, the encoder (i) generates the geometry frames, (ii) then the encoder compresses (encodes) the generated frames, (iii) then the encoder decompresses (decodes) the compressed geometry frames, and (iv) then the encoder reconstructs the geometric positions of the points. If geometry smoothing is enabled, the encoder may perform geometry smoothing to obtain modified geometry positions. Then, the encoder determines whether to perform attribute generation step using (i) the reconstructed geometry positions or (ii) the smoothed geometry positions based on whether the decoder will use the same geometry smoothing techniques as the encoder. Alternatively, if geometry smoothing is not enabled, the encoder performs the attribute generation step using the reconstructed geometry positions.

When generating the attribute frame, an attribute transfer step matches the attribute values (such as the color values) of each point of the original point cloud to (i) the reconstructed points or (ii) the smoothed points. If the encoder generates generating the attribute frames from the reconstructed points, an attribute transfer step determines the attribute values (such as the color values) of each point of the original point cloud based on the reconstructed points, since points could shift during the compression and decompression. If the encoder generates the attribute frames from the smoothed points, an attribute transfer step determines the attribute values (such as the color values) of each point of the original point cloud based on the smoothed points, since points could shift due to (i) the compression and decompression and (ii) geometry smoothing process. Accordingly, the attribute frames are slightly different based on whether the encoder generated the attribute frames based on the reconstructed points or the smoothed points.

In certain embodiments, the encoder can determine to generate the attribute frames based on the reconstructed points of the point cloud, since the geometry smoothing at the encoder could be different than a geometry smoothing at the decoder. In certain embodiments, the attribute frames can be generated based on the smoothed geometry points, when the encoder determines that the decoder will perform the same smoothing as performed by the encoder.

Based on how the attribute frames were generated at the encoder controls how the decoder reconstructs the point cloud. When the attribute frames are based on the smoothed geometry, the decoder (i) decompresses the geometry and attribute frames, (ii) reconstructs the geometric positions of the points, (iii) performs geometry smoothing (which is the same geometry smoothing as performed at the encoder), (iv) reconstructs the attributes using the attribute values from the reconstructed attribute frames (no attribute transfer is needed since the attribute values in the attribute frames correspond to the smoothed geometry), (v) performs attribute smoothing if attribute smoothing is enabled, and (vi) renders the reconstructed point cloud.

Alternatively, in certain embodiments, when the attribute frames are based on the reconstructed geometry and the decoder identifies that geometry smoothing is to be performed, the decoder (i) decompresses the geometry and attribute frames, (ii) reconstructs the geometric positions of the points, (iii) performs geometry smoothing, (iv) performs an attribute transfer step (transfers the attribute values from the reconstructed attribute frames to the smoothed geometric point positions), (v) performs attribute smoothing if attribute smoothing is enabled, and (vi) renders the reconstructed point cloud.

In other embodiments, when the attribute frames are based on the reconstructed geometry and the decoder identifies that geometry smoothing is not to be performed, then the decoder (i) decompresses the geometry and attribute frames, (ii) reconstructs the geometric positions of the points, (iii) reconstructs the attributes of the points (no attribute transfer is needed since the attribute values in the attribute frames correspond to the reconstructed geometry), (iv) performs attribute smoothing if attribute smoothing is enabled, and (v) renders the reconstructed point cloud.

Figure 5B:
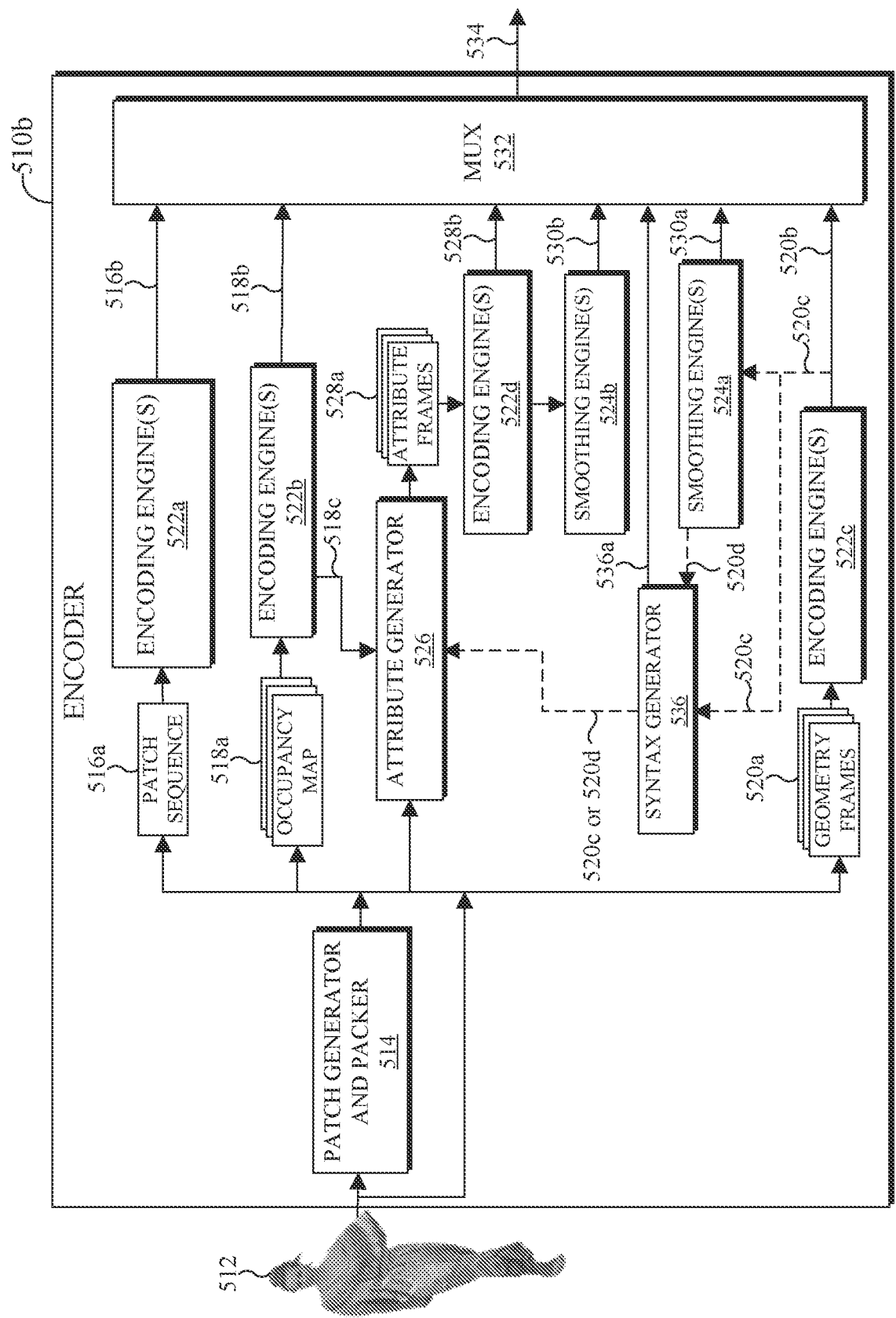
FIG. 5B illustrates an example block diagram of an encoder in accordance with an embodiment of this disclosure.

The attribute transfer step at the decoder, as described above, is computationally complex. However, eliminating the attribute transfer step results in losses in visual quality. Therefore, according to embodiments of the present disclosure, a syntax element can be included in the bitstream which specifies whether the attribute transfer step may be skipped, in order to lower the computational complexity requirements. Since attribute transfer step at the decoder is needed only when (i) the attribute frames were generated based on the reconstructed geometry (not the smoothed geometry) in the encoder and (ii) geometry smoothing is performed at the decoder, the flag may be conditionally signaled when geometry smoothing is enabled in the bitstream. FIG. 5B, described in greater detail below, describes an encoder that includes the syntax generator for indicating whether the decoder should skip the attribute transfer step.

As described above, the encoder can choose to use smoothed geometry or the reconstructed geometry to generate the attribute video. In other embodiments, the encoder always uses the reconstructed geometry to generate the attribute video, since the geometry smoothing engine of the encoder could be different than the geometry smoothing that is performed by the decoder. The value of the syntax element is based on which geometry (the smoothed geometry or the reconstructed geometry) the encoder used to generate the attribute frames. For example, if attribute frames are generated from reconstructed geometry, the encoder assigns a first value to the syntax element. Alternatively, if attribute frames are generated from smoothed geometry, the encoder assigns a second value. It is noted that when the value of the syntax element is the second value (indicating that the encoder generated the attribute frames from the smoothed geometry), the attribute transfer step can be skipped by the decoder, thereby substantially decreasing computational complexity for roughly similar quality.

Embodiments of the present disclosure provides additional systems and methods to reduce the complexity of the attribute transfer at the decoder. As described above, attribute transfer step at the decoder finds attribute data that corresponds to the smoothed geometry. In order to reduce the complexity of the attribute transfer step at the decoder, according to embodiments of the present disclosure, the decoder preforms attribute transfer only on the points that are affected by the geometry smoothing process.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
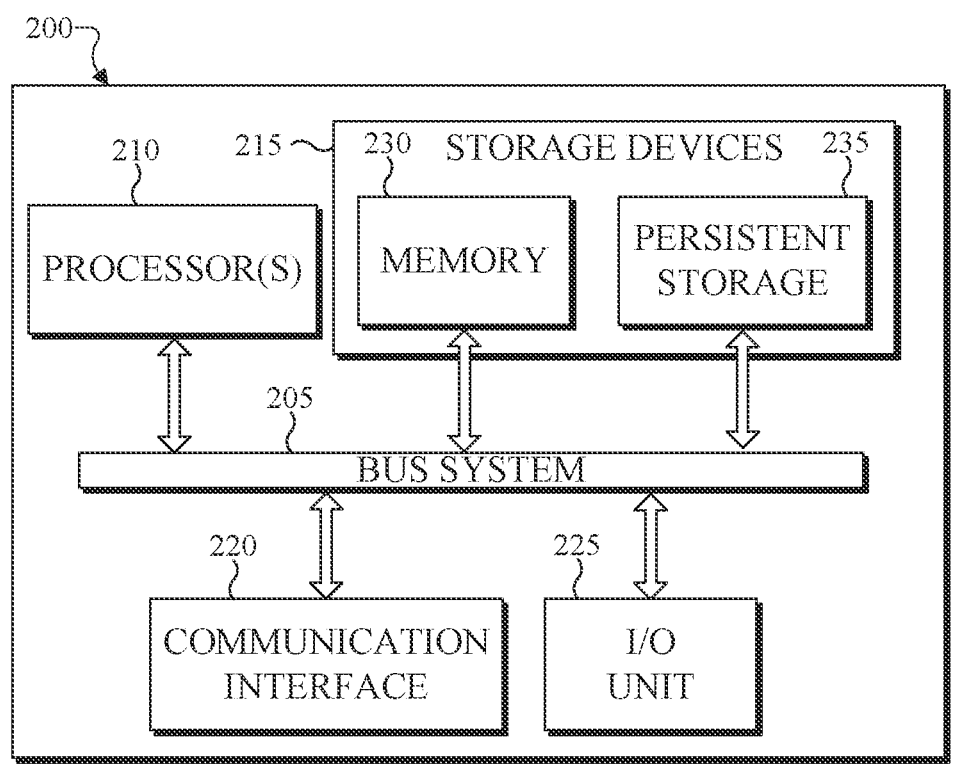
FIGS. 2 and 3 illustrate example electronic devices in accordance with an embodiment of this disclosure.
Figure 3:
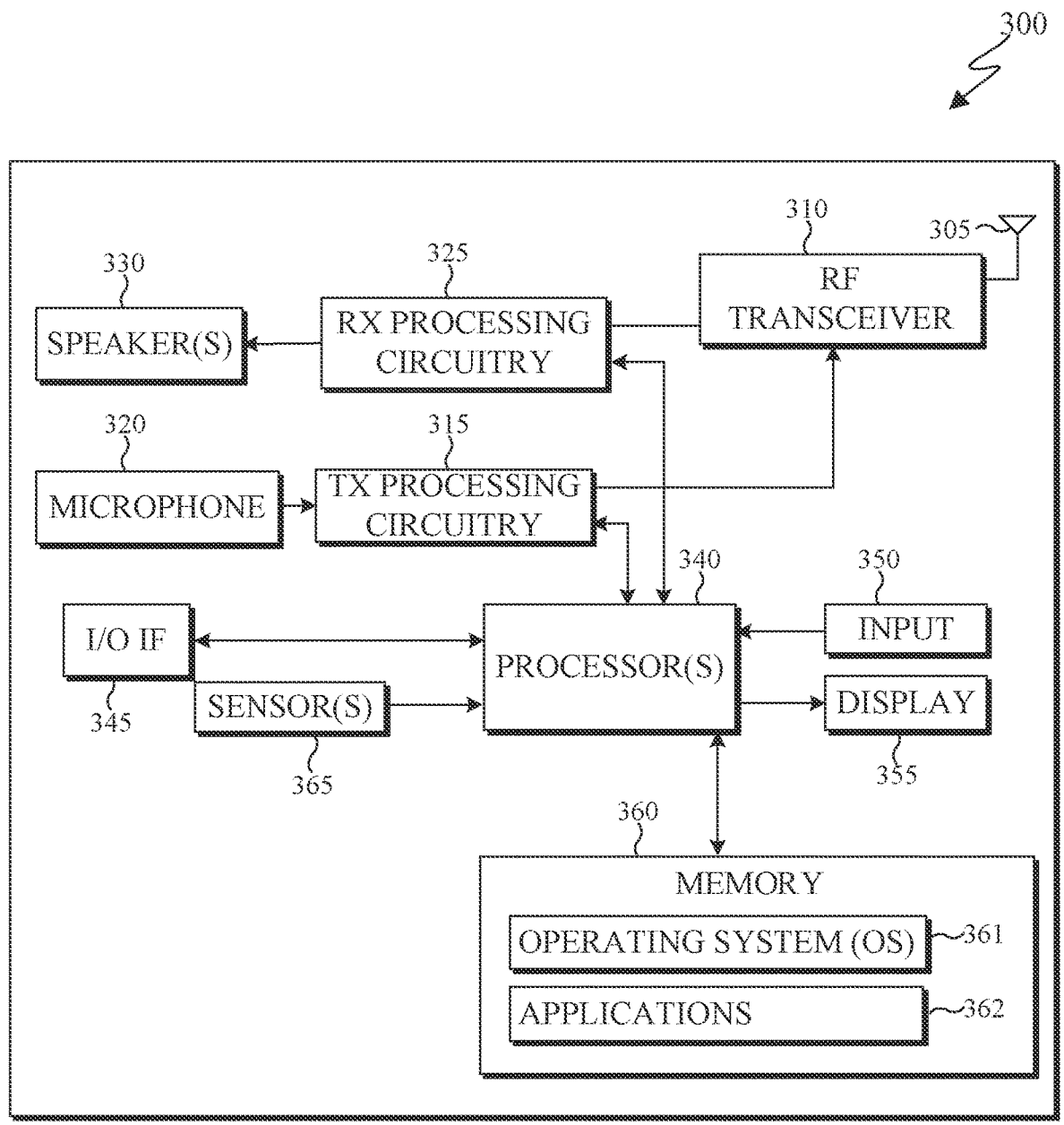

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 or the server 200 of FIG. 2 can project the point cloud into multiple patches. For example, a cluster of points of the point cloud can be grouped together and represented as a patch on the 2D frames. A patch can represent a single attribute of the point cloud from a particular map (or layer). Patches that represent the same attribute and belong to the same map can be packed into individual 2D frames, respectively. For example, a particular attribute from all the points belonging to a particular map forms a 2D frame. The 2D frames are then encoded to generate a bitstream. During the encoding process additional content such as metadata, flags, syntax elements, occupancy maps, geometry smoothing parameters, one or more attribute smoothing parameters, a patch sub-stream, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information (such as one or more flags, one or more syntax elements, or quantization parameter size), and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, one or more syntax elements, or quantization parameter size, one or more thresholds, geometry smoothing parameters, one or more attribute smoothing parameters, a patch sub-stream, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, 4C, and 4D illustrate various stages in generating frames that represent a 3D point cloud. In particular, FIG. 4A illustrate an example 3D point cloud 400 in accordance with an embodiment of this disclosure. FIG. 4B illustrates a diagram 405 of a point cloud that is surrounded by multiple projection planes in accordance with an embodiment of this disclosure. FIGS. 4C and 4D illustrate 2D frames that include patches representing the 3D point cloud 400 of FIG. 4A in accordance with an embodiment of this disclosure. For example, the FIG. 4C illustrates a 2D frame 430 that represents the geometric position of points of the 3D point cloud 400, while the FIG. 4D illustrates the frame 440 that represents the color associated with points of the 3D point cloud 400. In certain embodiments, the reconstructed point cloud 450 represents the 3D point cloud 400 of FIG. 4A, but reconstructed for rendering on a user device, while the 3D point cloud 400 of FIG. 4A can be located on a server.

The 3D point cloud 400 of FIGURE A is a set of data points in 3D space. Each point of the 3D point cloud 400 includes a geometric position that provides the structure of the 3D point cloud and one or more attributes that provide information about each point such as color, reflectiveness, material, and the like. The 3D point cloud 400 represents the entire 360° object. That is, the point cloud can be viewed from various angles such as the front 402, the sides, and the back 402, the top, the bottom.

The diagram 405 of FIG. 4B includes a point cloud 406. The point cloud 406 can be similar to the 3D point cloud 400 of FIG. 4A. That is, the point cloud 406 represents an entire 360° object. The point cloud 406 is surrounded by multiple projection planes, such as the projection plane 410, 412, 414, 416, 418, and 420. The projection plane 410 is separated from the projection plane 412 by a predefined distance. For example, the projection plane 410 corresponds to the projection plane XZ0 and the projection plane 412 corresponds to the projection plane XZ1. Similarly, the projection plane 414 is separated from the projection plane 416 by a predefined distance. For example, the projection plane 414 corresponds to the projection plane YZ0 and the projection plane 416 corresponds to the projection plane YZ1. Additionally, the projection plane 418 is separated from the projection plane 420 by a predefined distance. For example, the projection plane 418 corresponds to the projection plane XY0 and the projection plane 420 corresponds to the projection plane XY1. It is noted that additional projection planes can be included and the shape that the projection planes form can differ.

During the segmentation process, each of the points of the point cloud 406 are assigned to a particular projection plane, (such as the projection planes 410, 412, 414, 416, 418, and 420). The points that are near each other and are assigned to the same projection plane are grouped together to form a cluster which is represented as a patch such as any of the patches as illustrated in FIGS. 4C and 4D. More or less projection planes can be used when assigning points to a particular projection plane. Moreover, the projection planes can be at various locations and angles. For example, certain projection planes can be at a 45 degree incline with respect to the other projection planes, Similarly, certain projection planes can be at a 90 degree angle with respect to other projection planes, FIGS. 4C and 4D illustrate the 2D frames 430 and 440, respectively. The frame 430 is a geometry frame as it illustrates the geometric location of each point of the 3D point cloud 400 of FIG. 4A. The frame 430 includes multiple patches (such as a patch 432) representing the depth values of the 3D point cloud 400. The value of each pixel in the frame 430 is represented as a lighter or darker color and corresponds to a distance each pixel is from a particular projection plane (such as one of the projection planes 410, 412, 414, 416, 418, and 420 of FIG. 4B).

The frame 440 is a color frame (one type of attribute) as it provides the color of each point of the 3D point cloud 400 of FIG. 4A. The frame 440 includes multiple patches (such as a patch 442) representing values corresponding to the color of a point in the 3D point cloud 400.

Each of the patches in FIGS. 4C and 4D can be identified by an index number. Similarly, each pixel within a patch can be identified by its location within the frame as well as the index number of the patch to which the pixel is within.

A correspondence (or mapping) exists between the frame 430 and the frame 440. That is, each pixel in the frame 430 corresponds to a pixel at the same location in the frame 440. Each pixel of color in the frame 440 corresponds to a particular geometry pixel in the frame 430. For example, a mapping is generated between each pixel in the frame 430 and the frame 440. For example, each pixel within the patch 432 corresponds to a point in 3D space, and each pixel within in the patch 442 provides a color to a point of the 3D point cloud that is represented at the same location in the patch 432. As shown in the frames 430 and 440, some of the pixels correspond to valid pixels that represent the 3D point cloud 400 while other pixels (the black area in the background) correspond to invalid pixels that do not represent the 3D point cloud 400.

Non-neighboring points in 3D space could end up being represented as pixels that are next to each other in the frames 430 and 440. For example, two clusters of points that are not next to each other in 3D space could be represented as patches that are adjacent to one another in the frames 430 and 440.

The frames 430 and 440 can be encoded with a video codec such as HEVC, AVC, VP9, VP8, VVC, AV1, and the like. A decoder receives a bitstream that includes the frames 430 and 440 and reconstructs the geometry of the 3D point cloud from the frame 430 and colors the geometry of the point cloud based on the frame 440 in order to generate the reconstructed point cloud.

Although FIGS. 4A, 4B, 4C, and 4D illustrate example point cloud and 2D frames representing a point cloud various changes can be made to FIGS. 4A, 4B, 4C, and 4D. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, and 4D do not limit this disclosure to any particular 3D object(s) and 2D frames representing the 3D object(s).

Figure 5C:
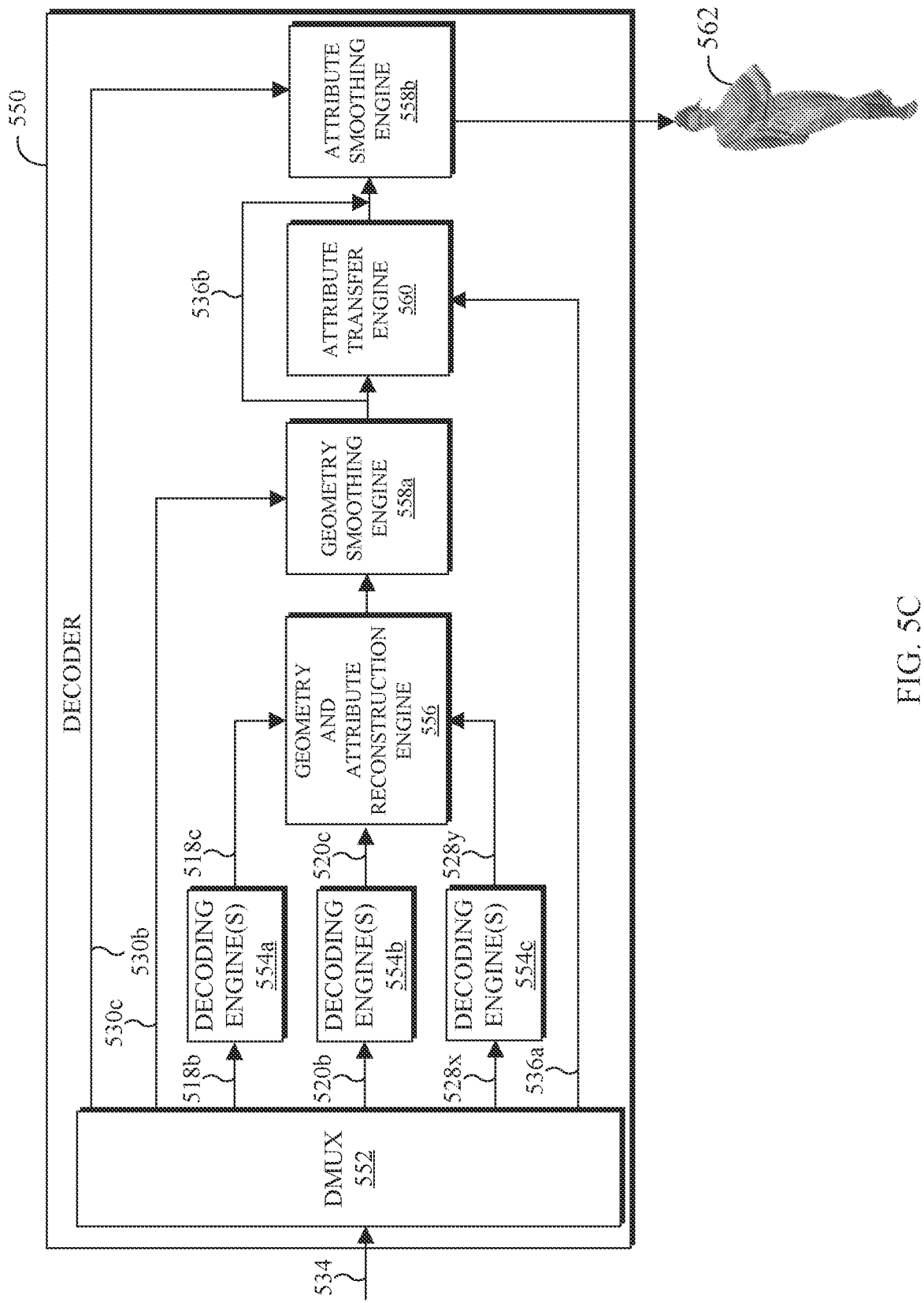
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The encoder 510 is described in greater detail in FIG. 5B. The decoder 550 is described in greater detail in FIG. 5C.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

Generally, the encoder 510 receives 3D media content, such as a point cloud, from another device such as a server (similar to the server 104 of FIG. 1, the server 200 of FIG. 2), an information repository (such as a database), or one of the client devices 106-116. In certain embodiments, the encoder 510 can receive media content from multiple cameras and stitch the content together to generate a 3D scene that includes one or more point clouds.

The encoder 510 projects points of the point cloud into multiple patches that represent the projection. The encoder 510 clusters points of a point cloud into groups which are projected onto different planes such as an XY plane, an YZ plane, and an XZ plane. Each cluster of points is represented by a patch when projected onto a plane. The encoder 510 packs and stores information representing the onto a 2D frame. The encoder 510 packs the patches representing the point cloud onto 2D frames. The 2D frames can be video frames. It is noted, a point of the 3D point cloud is located in 3D space based on a (X, Y, Z) coordinate value, but when the point is projected onto a 2D frame the pixel representing the projected point is denoted by the column and row index of the frame indicated by the coordinate (u, v). Additionally, 'u' and 'v' can range from zero to the number of rows or columns in the depth image, respectively.

Each of the 2D frames represents a particular attribute, such as one set of frames can represent geometry and another set of frames can represent an attribute (such as color). It should be noted that additional frames can be generated based on more layers as well as each additionally defined attribute.

The encoder 510 also generates an occupancy map based on the geometry frame to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v). An invalid pixel can include information such as padding that can increase the encoding efficiency but does not provide any information associated with the point cloud itself. Generally, the occupancy map is binary, such that the value of each pixel is either one or zero. For example, when the value of a pixel at position (u, v) of the occupancy map is one, indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid, and therefore does not represent a point of the 3D point cloud. A non-binary occupancy map may be thresholded or processed to generate a binary occupancy map.

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550 receives a bitstream that represents media content, such as a point cloud. The bitstreams can include data representing a 3D point cloud. In certain embodiments, the decoder 550 can decode the bitstream and generate multiple frames such as one or more geometry frames, one or more attribute frames, and one or more occupancy map frames. The decoder 550 reconstructs the point cloud using the multiple frames, which can be rendered and viewed by a user. The decoder 550 can also perform smoothing, such as geometry smoothing and attribute smoothing.

The encoder 510 receives a 3D point cloud 512 and generates a bitstream 534. The bitstream 534 includes data representing a 3D point cloud 512. The bitstream 534 can include multiple sub-bitstreams. The bitstream 534 can be transmitted via the network 502 of FIG. 5A to another device, such as the decoder 550, an electronic device that includes the decoder 550, or an information repository. The encoder 510 includes a patch generator and packer 514, one or more encoding engines (such as encoding engine 522a, 522b, 522c, and 522d which are collectively referred to as encoding engines 522), an attribute generator 526, one or more smoothing engines (such as the geometry smoothing engine 524a and the attribute smoothing engine 524b), and a multiplexer 532.

The 3D point cloud 512 can be stored in memory (not shown) or received from another electronic device (not shown). The 3D point cloud 512 can be a single 3D object (similar to the 3D point cloud 400 of FIG. 4A), or a grouping of 3D objects. The 3D point cloud 512 can be a stationary object or an object which moves.

The patch generator and packer 514 generates patches by taking projections of the 3D point cloud 512 and packs the patches into frames. In certain embodiments, the patch generator and packer 514 splits the geometry information and attribute information of each point of the 3D point cloud 512. The patch generator and packer 514 can use two or more projection planes (such as two or more the projection plans 410-420 of FIG. 4B), to cluster the points of the 3D point cloud 512 to generate the patches. The geometry patches are eventually packed into the geometry frames 520a.

The patch generator and packer 514 determines the best projection plane for each point of the 3D point cloud 512. When projected, each cluster of points of the 3D point cloud 512 appears as patch (also referred to as a regular patch) on the frames (such as the geometry frames 520a). A single cluster of points can be represented by multiple patches (located on different frames), where each patch represents a particular aspect of each point within the cluster of points. For example, a patch representing the geometry locations of the cluster of points is located on the geometry frame 520a, and patch representing an attribute of the cluster of points is located on the attribute frame 528a.

After determining the best projection plane for each point of the 3D point cloud 512 the patch generator and packer 514 segments the points into patch data structures that are packed frames, such as the geometry frames 520a. As illustrated in FIGS. 4C and 4D, discussed above, the patches are organized by attributes and places the patches within corresponding frames, such as the patch 432 is included in the geometry frame 430 and the patch 442 is included in the attribute frame 440. It is noted that patches representing different attributes of the same cluster of points include a correspondence or a mapping, such a pixel in one patch corresponds to the same pixel in another patch, based on the locations of the pixels being at the same position in the respective frames.

The patch generator and packer 514 also generates patch information such as the patch sequence 516a. The patch information provides providing information about the patches, such as an index number that is associated with each patch.

The patch generator and packer 514 also generates occupancy map frames 518a. The occupancy map frames 518a represent occupancy maps that indicate the valid pixels in the frames (such as the geometry frames 520a). For example, the occupancy map frames 518a indicate whether each pixel in the geometry frame 520a is a valid pixel or an invalid pixel. Each valid pixel in the occupancy map frames 518a corresponds to pixels in the geometry frames 520a that represents a position point of the 3D point cloud 512 in 3D space. In contrast, the invalid pixels are pixels within the occupancy map frames 518a correspond to pixels in the geometry frames 520a that do not represent a point of the 3D point cloud 512 (such as the empty/black space in the frames 430 and 440 of FIGS. 4C and 4D). In certain embodiments, one of the occupancy map frames 518a can correspond to both a geometry frame 520a and an attribute frame 528a (discussed below).

For example, when the patch generator and packer 514 generates the occupancy map frames 518a, the occupancy map frames 518a include predefined values for each pixel, such as zero or one. For example, when a pixel of one of the occupancy map frames 518a at position (u, v) is a value of zero, indicates that the pixel at (u, v) in the geometry frame 520a is invalid. An invalid pixel can represent padding that increases the encoding efficiency but does not provide any information associated with the point cloud itself. Similarly, when a pixel of one of the occupancy map frames 518a at position (u, v) is a value of one, indicates that the pixel at (u, v) in the geometry frame 520a is valid and thereby includes information representing a point of the 3D point cloud.

The geometry frames 520a include pixels representing the geometry values of the 3D point cloud 512. The geometry frames 520a include the geometric location of each point of the 3D point cloud 512. The geometry frames 520a are used to encode the geometry information of the point cloud. For example, the two transverse coordinates (with respect to the projection plane) of a 3D point corresponds to the column and row indices in the geometry video frame (u, v) plus a transverse-offset which indicates the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

The encoder 510 also includes one or more encoding engines 522. In certain embodiments, the frames (such as the geometry frames 520a, the occupancy map frames 518a, and the attribute frames 528a) and the patch sequence 516a are encoded by independent encoding engines 522, as illustrated. In other embodiments, a single encoding engine performs the encoding of the frames and the patch sequence 516a.

The encoding engines 522 can be configured to support an 8-bit, a 10-bit, a 12-bit, a 14-bit, or a 16-bit, precision of data. The encoding engines 522 can include a video or image codec such as HEVC, AVC, VP9, VP8, VVC, EVC, AV1 and the like to compress the 2D frames representing the 3D point cloud. The one or more of the encoding engines 522 can compress the information in a lossy or lossless manner.

As illustrated, the encoding engine 522a receives the patch sequence 516a, performs compression to generate the patch sequence substream 516b. The encoding engine 522b receives occupancy map frames 518a performs occupancy map compression to generate an occupancy map substream 518b. The encoding engine 522c receives geometry frames 516 performs geometry compression to generate a geometry substream 520b. The encoding engine 522d receives attribute frames 528a performs attribute compression to generate an attribute substream 528b.

After the encoding engine 522c generates the geometry substream 520b, a decoding engine (not shown) can decode the geometry substream 520b to generate the reconstructed geometry 520c. Similarly, after the encoding engine 522b generates the occupancy map substream 518b, a decoding engine (not shown) can decode the occupancy map substream 518b to generate the reconstructed occupancy map frames 518c.

In certain embodiments, the geometry smoothing engine 524a performs geometry smoothing on the reconstructed geometry 520c to generate smoothed geometry 520d and geometry smoothing parameters 530a. In certain embodiments, the geometry smoothing parameters 530a can be compressed. In certain embodiments, geometry smoothing may not be enabled, as such, the geometry smoothing engine 524a does not perform geometry smoothing. When geometry smoothing is not enabled, the attribute generator 526 generates the attribute frames 528a based on the reconstructed geometry 520c.

The attribute generator 526 generates the attribute frames 528a based on the attribute information from the 3D point cloud 512, the reconstructed occupancy map frames 518c, the information provided by the patch generator and packer 514, and either (i) the reconstructed geometry 520c or (ii) the smoothed geometry 520d. That is, the attribute generator 526 receives either the reconstructed geometry 520c or the smoothed geometry 520d, not both. The attribute generator 526 then uses either the reconstructed geometry 520c or the smoothed geometry 520d to generate the attribute frames 528a.

In certain embodiments, the attribute generator 526 uses the reconstructed geometry 520c regardless of whether the smoothing engine 524a generates the smoothed geometry 520d. For example, the encoder 510 can generate one of the attribute frames 528a that represent color, based on the reconstructed geometry 520c, even when the smoothing engine 524a performs geometry smoothing and generates the smoothed geometry 520d. First, the geometry frames 520a are compressed by the encoding engine 522c using a 2D video codec such as HEVC. The geometry substream 520b is then decoded to generate the reconstructed geometry 520c. Similarly, the occupancy map frames 518a are compressed using the encoding engine 522b and then decompressed to generate the reconstructed occupancy map frames 518c. The encoder 510 can then reconstruct the geometric locations of the points of the 3D point cloud based on the reconstructed geometry 520c and the reconstructed occupancy map frames 518c. The attribute generator 526 performs an attribute transfer step (denoted as the first attribute transfer) by interpolating the attribute values (such as color) of each point from the color values of input point cloud to the reconstructed point cloud and the original 3D point cloud 512. The interpolated colors are then segmented, by the attribute generator 528, to match the same patches as the geometry information. The attribute generator 528 then packs interpolated attribute values into an attribute frame 528a representing color.

In certain embodiments, the encoder 510 generates one of the attribute frames 528a that represent color based on the smoothed geometry 520d (when geometry smoothing is enabled and performed in the encoder 510). First, the geometry frames 520a are compressed by the encoding engine 522c using a 2D video codec such as HEVC. The geometry substream 520b is then decoded to generate the reconstructed geometry 520c. The geometry smoothing engine 524a performs on the reconstructed geometry 520c to generate smoothed geometry 520d. Similarly, the occupancy map frames 518a are compressed using the encoding engine 522b and then decompressed to generate the reconstructed occupancy map frames 518c. The encoder 510 can then reconstruct the geometric locations of the points of the 3D point cloud based on the smoothed geometry 520d and the reconstructed occupancy map frames 518c. The attribute generator 528 performs an attribute transfer step (denoted as the first attribute transfer) by interpolating the attribute values (such as color) of each point from the color values of input point cloud to the smoothed reconstructed point cloud and the original 3D point cloud 512. The interpolated colors are then segmented, by the attribute generator 528, to match the same patches as the geometry information. The attribute generator 528 then packs interpolated attribute values into an attribute frame 528a representing color.

It is noted that in certain embodiments, the encoder 510 generates the attribute frames 528a based on the smoothed geometry points when the encoder receives an indication or determines that the decoder 550 will perform the same geometry smoothing as performed in the encoder. Alternatively, if the encoder 510 receives an indication or determines that the decoder 550 will perform the geometry smoothing differently than the encoder 510 then the encoder 510 generates the attribute frames 528a based on the reconstructed geometry 520c rather than the smoothed geometry 520d.

The attribute frames 528a represents different attributes of the point cloud. For example, for one of the geometry frames 520a there can be one or more corresponding attribute frames 528a. The attribute frame can include color, texture, normal, material properties, reflection, motion, and the like. In certain embodiments, one of the attribute frames 528a can include color values for each of the geometry points within one of the geometry frames 520a, while another attribute frame can include reflectance values which indicate the level of reflectance of each corresponding geometry point within the same geometry frame 520a. Each additional attribute frame 528a represents other attributes associated with a particular geometry frame 520a. In certain embodiments, each geometry frame 520a has at least one corresponding attribute frame 528a.

In certain embodiments, the attribute smoothing engine 524b performs attribute smoothing on the reconstructed attribute frames to generate attribute smoothing parameters 530b. In certain embodiments, the attribute smoothing parameters 530b can be compressed. In certain embodiments, attribute smoothing is optional and can be skipped.

The multiplexer 532 combines the patch sequence substream 516b, the geometry substream 520b, the occupancy map substream 518b, and the attribute substream 528b, to create the bitstream 534. In certain embodiments, the multiplexer 532 also combines the geometry smoothing parameters 530a when creating the bitstream 534. In certain embodiments, the multiplexer 532 also combines the attribute smoothing parameters 530b when creating the bitstream 534. When the encoder 510, includes the syntax generator 536, the multiplexer 532 also combines the syntax element 536a that is generated by the syntax generator 536 when creating the bitstream 534

The encoder 510 also includes a syntax generator 536. The syntax generator 536 generates a syntax element which indicates to the decoder 550 whether the attribute transfer step at the decoder should be skipped. The syntax element 536a generated by the syntax generator 536 can be denoted as skip_attribute_transfer_flag. But the actual name may be different. In certain embodiments, the syntax element 536a is signaled in an SEI message, or at the V-PCC sequence parameter set level, or at an Atlas sequence parameter set level.

In certain embodiments, the syntax generator 536 is omitted from the encoder 510. For example, when the syntax generator 536 is omitted from the encoder 510, the attribute generator 526 will generate the attribute frames 528a based on the reconstructed geometry 520c.

As described above, the attribute generator 526 receives either (i) the reconstructed geometry 520c or (ii) the smoothed geometry 520d. For example, the attribute generator 526 receives either the reconstructed geometry 520c or the smoothed geometry 520d, based on the of the syntax generator 536. In certain embodiments, the syntax generator 536 can generate a flag or a syntax 536a indicating whether the attribute transfer step at the decoder 550 should be skipped, based on whether the reconstructed geometry 520c or the smoothed geometry 520d, is used by the attribute generator 526 to generate the attribute frames 528a. For example, when the flag is a first value, the decoder 550 skips the attribute transfer step and when the flag is a second value, the decoder 550 performs the attribute transfer step.

For example, the encoder 510 can choose to use smoothed geometry 520d or the reconstructed geometry 520c to generate the attribute video. The value of the syntax element 536a (skip_attribute_transfer_flag) is based on which geometry (the smoothed geometry 520d or the reconstructed geometry 520c) that the encoder 510 used to generate the attribute frames 528a. For example, if attribute frames 528a are generated from reconstructed geometry 520c, then the encoder 510 assigns a value (such as zero) to the syntax element 536a (skip_attribute_transfer_flag). Alternatively, if attribute frames 528a are generated from smoothed geometry 520d, then the encoder 510 assigns another value (such as one) to the syntax element 536a (skip_attribute_transfer_flag). For example, when the value of syntax element 536a (skip_attribute_transfer_flag) is one (indicating that the encoder 510 generated the attribute frames from the smoothed geometry), the attribute transfer step can be skipped by the decoder 550, thereby substantially decreasing computational complexity for roughly similar quality.

In certain embodiments, if the encoder 510 expects the bitstream to be decoded by a decoder that uses the same geometry smoothing method as used by the encoder 510, (that is, if the decoder 550 is expected to conform to the reconstruction profile recommended by the encoder 510, the encoder 510 generates the attribute video based on smoothed geometry 520d and assigns a value of one to the syntax element 536a (skip_attribute_transfer_flag). Otherwise the encoder 510 generates the attribute video based on reconstructed geometry 520c and assigns a value of zero to the syntax element 536a (skip_attribute_transfer_flag).

As described in greater detail below, such as in FIGS. 5C and 6B, a decoder can identify the syntax element 536a (skip_attribute_transfer_flag) located in the bitstream 534. If the value of the syntax element 536a (skip_attribute_transfer_flag) is one, the decoder skips the attribute transfer step. In this case, if attribute smoothing is enabled, the reconstructed attributes are directly input to the attribute smoothing stage. If attribute smoothing is disabled, the reconstructed attributes are directly used to reconstruct point cloud. If the value of the syntax element 536a (skip_attribute_transfer_flag) is zero, the decoder performs attribute transfer step based on reconstructed attributes and smoothed geometry.

Syntax (1) below described the signaling of the syntax element 536a. In the example of Syntax (1), the syntax element 536a is named gs_skip_attribute_transfer_flag to reflect that it is a part of geometry smoothing SEI message. In this case, the signaling is conditional upon geometry smoothing being used. It is understood that the flag may be signaled in a different place such as sequence parameter set or Atlas sequence parameter set. As such the signaling o the flag may not be dependent on geometry smoothing being used, and a different name may be used.

```
Syntax                                              (1)
geometry_smoothing ( payloadSize ) {
    gs_smoothing_cancel_flag
    gs_smoothing_filters_present
    for ( i=0; i < gs_smoothing_filters_present; i++ ) {
        gs_smoothing_filter_index[ i ]
        k = gs_smoothing_filter_index[ i ]
        gs_smoothing_filter_cancel_flag[ k ]
        if( gs_smoothing_filter_cancel_flag[ k ] != 1 ) {
            gs_smoothing_method_type[ k ]
            if (gs_smoothing_method_type[ k ] > 0 ) {
                gs_skip_attribute_transfer_flag[ k ]
            }
            if (gs_smoothing_method_type[ k ] == 1 ) {
                gs_smoothing_grid_size_minus2[ k ]
                gs_smoothing_threshold[ k ]
            }
        }
    }
}
```

As described in Syntax (1), the expression gs_smoothing_method_type[k] indicates the k-th type of geometry smoothing method that can be used for processing the current point cloud frame. For example, if the value is zero then no geometry smoothing is performed and when the value is one, the grid based geometry smoothing is performed. The expression gs_skip_attribute_transfer_flag[k] equal to one specifies that the attribute transfer step is skipped by the decoder when k-th type of geometry smoothing method is used. gs_skip_attribute_transfer_flag[k] equal to zero specifies that the attribute transfer step is performed by the decoder when k-th type of geometry smoothing method is used. In certain embodiments, when gs_skip_attribute_transfer_flag[k] is not present in the bitstream, its value is assumed to be one. The expression, gs_smoothing_grid_size_minus2[k] specifies the value of the variable GeometrySmoothingGridSize[k] used for geometry smoothing for filter with index k. The value of gs_geometry_smoothing_grid_size_minus2[k] can be in the range of 0 to 126, inclusive. When not present, the value of gs_smoothing_grid_size_minus2[k] is inferred to be equal to zero. The value of GeometrySmoothingGridSize[k] based on Equation (1), below.

$$\text{GeometrySmoothingGridSize}[k] = gs\_smoothing\_grid\_size\_minus2[k]+2 \quad \text{Equation (1)}$$

FIG. 5C illustrates the decoder 550 that includes a demultiplexer 552, one or more decoding engines (such as a decoding engine 554a, a decoding engine 554b, and a decoding engine 554c), a geometry and attribute reconstruction engine 556 smoothing engines (such as a geometry smoothing engine 558a and an attribute smoothing 558b), and an attribute reconstruction engine 560.

The decoder 550 receives a bitstream 534, such as the bitstream that was generated by the encoder 510. The demultiplexer 552 separates bitstream 534 into one or more sub-streams representing the different information. For example, the demultiplexer 552 separates various streams of data such into the individual substreams such as the patch sequence substream, the geometry smoothing parameters 530c, the attribute smoothing parameters 530b, the syntax element 536a, the geometry substream 520b, the occupancy map substream 518b, and the attribute substream 528x. In certain embodiments, the geometry smoothing parameters 530c is not included in the bitstream if the encoder 550 did not perform geometry smoothing. The geometry smoothing parameters 530c can be similar to the geometry smoothing parameters 530a of FIG. 5B.

The decoder 550 includes one or more decoding engines. For example, the decoder 550 can include the decoding engine 554a, a decoding engine 554b, a decoding engine 554c, and a decoding engine 554d (collectively referred to as the decoding engines 554). In certain embodiments, a single decoding engine performs the operations of all of the individual decoding engines 554.

The decoding engine 554a decodes the occupancy map substream 518b into reconstructed occupancy map frames 518c. Similarly, the decoding engine 554b decodes the geometry substream 520b into reconstructed geometry 520c. Additionally, the decoding engine 554c decodes the attribute substream 528x into reconstructed attribute 528y. It is noted that the attribute substream 528x is dependent on what data was used to generate the attribute frames 528a of FIG. 5B. For example, the encoder 510 could have used the smoothed geometry 520d or the reconstructed geometry 520c to generate the attribute frames 528a.

After the patch sequence information, the reconstructed geometry 520c, and the reconstructed occupancy map frames 518c, are decoded, the geometry and attribute reconstruction engine 556 generates a reconstructed point cloud.

The geometry and attribute reconstruction engine 556 reconstructs the points of the point cloud in 3D space, based on the reconstructed occupancy map frames 518c, the reconstructed geometry 520c, and the reconstructed attribute 528y.

The value of the syntax element 536a, indicates how the decoder 550 reconstructs the point cloud 562. For example, if the decoder receives an indication from the encoder 510 to not perform the second attribute transfer step (based on the value of the syntax element 536a), then the decoder 550 skips the attribute transfer engine via path 536b. It is noted that when the decoder 550 follows path 536b, the attribute frames generated by the encoder 510, were based on the smoothed geometry 520d.

In certain embodiments, the geometry smoothing engine 558a can be enabled or disabled. If the geometry smoothing engine 558a is enabled, then the geometry smoothing engine 558a performs smoothing to the geometry points of the reconstructed point cloud.

The value of the syntax element 536a indicates whether the decoder skips the attribute transfer and follows path 536b. For example, when the value syntax element 536a is one (1), the attribute transfer engine 560 does not perform an attribute transfer, since the encoder 510 generated the attribute frames based on the smoothed geometry. When the value of the syntax element 536a is zero (0), the attribute transfer engine 560 performs the second attribute transfer since the reconstructed attribute 528y (when generated at the encoder 510) are based on the reconstructed geometry 520c. For instance, since the geometry smoothing engine 558a performed smoothing to the geometry points, and the corresponding attribute information from the reconstructed attribute 528y is based on the reconstructed geometry 520c, the attribute information based on reconstructed attribute 528y does not correspond to the smoothed points of the point cloud. After the attribute transfer engine 560 modifies the attributes information to match the smoothed geometry points (via the geometry smoothing engine 558a), the attribute smoothing engine 558b performs attribute smoothing if attribute smoothing is enabled. If attribute smoothing is enabled, the attribute smoothing engine 558b performs attribute smoothing and the decoder 550 outputs the reconstructed point cloud 562. If the attribute smoothing is not enabled, the attribute smoothing engine 558b does not performs attribute smoothing and the decoder 550 outputs the reconstructed point cloud 562, based on the output of the attribute transfer engine 560. It is noted that the reconstructed point cloud 562 is similar to the 3D point cloud 512.

For example, if the value of the syntax element 536a is zero (0), then the decoder 550, via the attribute transfer engine 560, performs attribute transfer step based on reconstructed attributes and smoothed geometry (via the geometry smoothing engine 558a). However, if the value of the syntax element 536a is one (1), then the decoder 550 skips the attribute transfer step which is performed by the attribute transfer engine 560. In this case, if attribute smoothing is enabled (via the attribute smoothing engine 558b), the reconstructed attributes are directly input to the attribute smoothing stage. If attribute smoothing is disabled (the decoder 550 can skip the attribute smoothing engine 558b), the reconstructed attributes are directly used to reconstruct point cloud 562.

It is noted that when the encoder 510 generated the attribute frames based on the reconstructed geometry 520c (not the smoothed geometry 520d), as indicated by the value of the syntax element 536a, the attribute transfer step (as performed by the attribute transfer engine 560) matches the points of the smoothed reconstructed geometry of the point cloud with the content of the attribute frames which are based on the reconstructed geometry 520c (not the smoothed geometry 520d). The attribute transfer step (as performed by the attribute transfer engine 560) is denoted as the second attribute transfer step since the encoder 510 performs the first attribute transfer step. As discussed above, the encoder 510 can generate the attribute frames based on either the reconstructed geometry or the smoothed geometry. To generate the attribute frames based on the reconstructed geometry, the encoder 510 (i) generate the geometry frames, (ii) compresses the geometry frames, (iii) decompresses the geometry frames, (iv) reconstructs the geometry of the 3D point cloud, and then (iv) generates the attribute frames based on the reconstructed geometry of the 3D point cloud, by performing the first attribute transfer step by matching the attributes of the points of the 3D point cloud to the points of the reconstructed geometry of the 3D point cloud. That is, since the geometry position of some points may have shifted due to the compression and subsequent decompression of the geometry information, the first attribute transfer step is performed to match the attributes of the original point cloud with the modified points of the reconstructed geometry of the 3D point cloud. Accordingly, the decoder 550 performs the second attribute transfer step, via the attribute transfer engine 560. The attribute transfer engine 560 matches the attribute information, that was generated based on the reconstructed geometry of the 3D point cloud, with the modified points of the geometric points that are smoothed via the geometry smoothing engine 558a. That is, since the attribute information no longer matches the points of the point cloud, due to the geometry smoothing that was performed by the geometry smoothing engine 558a of the decoder 550, the attribute reconstruction and transfer engine 560 performs the second attribute transfer and then applies the attribute information to the smoothed geometry points. After applying the attribute information to the smoothed geometry points, the decoder 550 can determine whether to perform attribute smoothing. When the decoder 550 performs attribute smoothing, then attribute smoothing engine 558b performs attribute smoothing and then the decoder 550 renders the reconstructed point cloud 562. Alternatively, when the decoder 550 does not perform attribute smoothing, then attribute smoothing engine 558b is skipped and the decoder 550 renders the reconstructed point cloud 562. It is noted that the reconstructed point cloud 562 is similar to the 3D point cloud 512. The decoder 550 can perform attribute smoothing or skip attribute smoothing based on received indication that is included in the bitstream 534.

Embodiment of the present disclosure recognize that the second attribute transfer step computationally complex. Due to the computational complexity of the second attribute transfer step, lag, battery drain, and the like are can degrade the user experience at the user device, when rendering the point cloud. Therefore embodiments of the present disclosure provide systems and methods to decrease the computation by performing the second attribute transfer for only certain points of the 3D point cloud. For example, since the geometry smoothing engine 558a may modify and smooth only a portion of the geometry points of the 3D, the computational complexity of the second attribute transfer step may be reduced by performing the attribute transfer on only the points that were shifted during the geometry smoothing by the geometry smoothing engine 558a.

Although FIG. 5A illustrate the environment-architecture 500, FIG. 5B illustrates the encoder 510, and FIG. 5C illustrates the decoder 550, various changes can be made to FIGS. 5A, 5B, and 5C. For example, any number of encoders or decoders can be included environment-architecture 500.

Figure 6A:
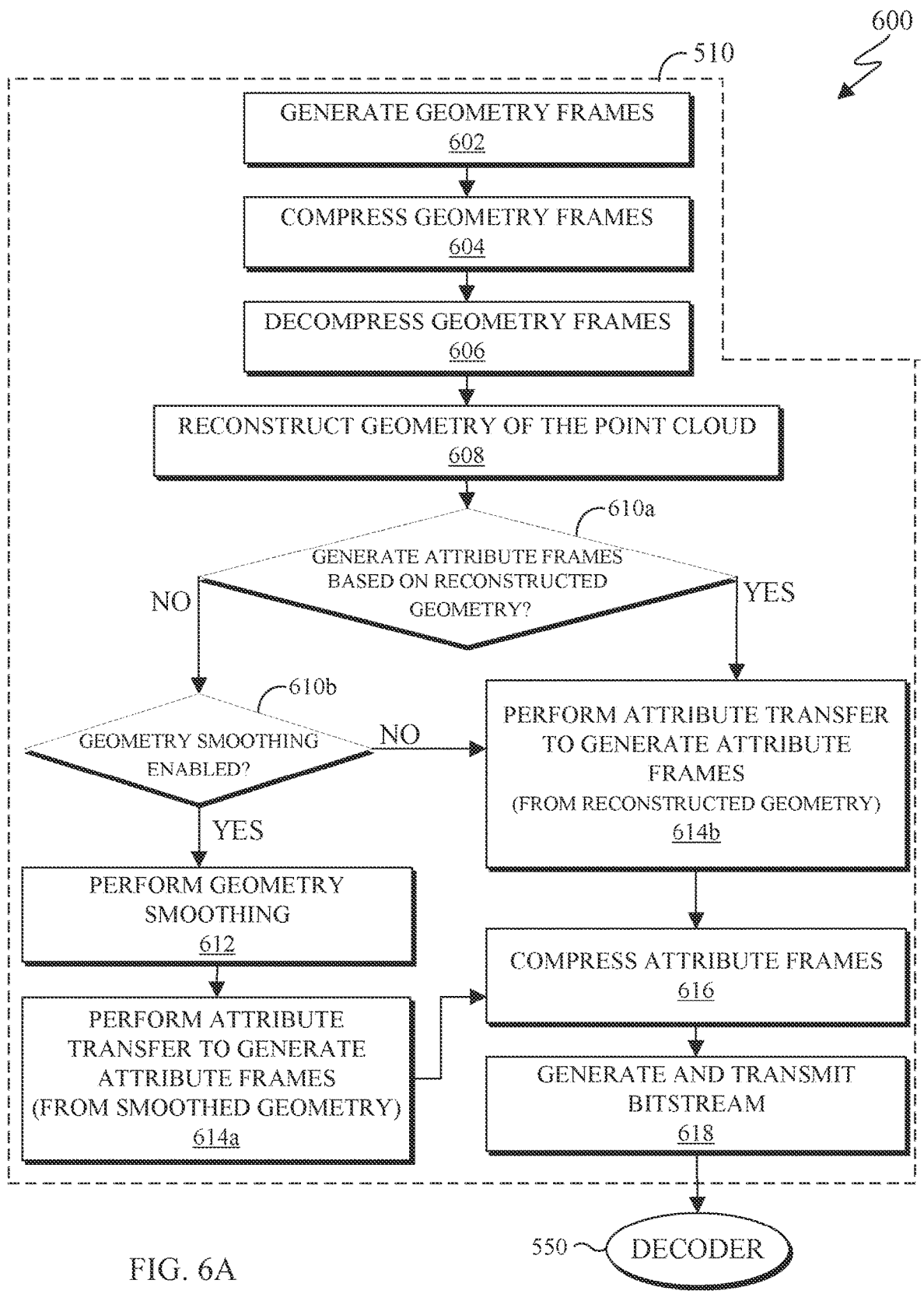
FIGS. 6A and 6B illustrates example flowcharts for encoding and decoding a bitstream in accordance with an embodiment of this disclosure.
Figure 6B:
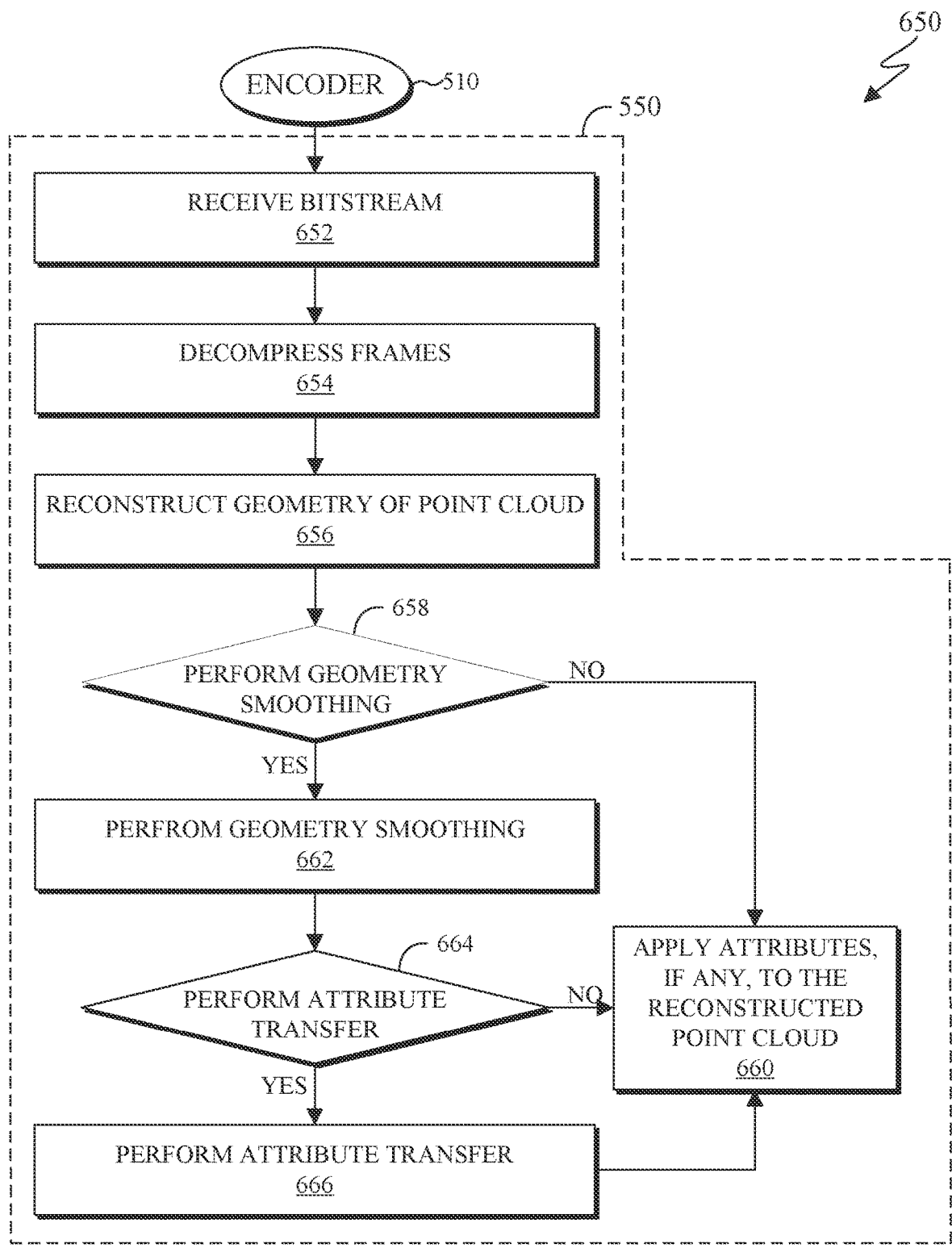

FIGS. 6A and 6B illustrates example flowcharts 600 and 650 for encoding and decoding a bitstream in accordance with an embodiment of this disclosure. In particular, the flowchart 600 describes a method for point cloud encoding and the flowchart 650 describes a method for point cloud decoding. The flowchart 600 can be performed by the server 104 or any of the client devices 106-116 of FIG. 1, the server 200 of FIG. 2, the electronic device 300 of FIG. 3, the encoder 510 of FIGS. 5A and 5B or any other suitable device or system. For ease of explanation, the flowchart 600 is described as being performed by the encoder 510. Similarly, the flowchart 650 can be performed by the server 104 or any of the client devices 106-116 of FIG. 1, the server 200 of FIG. 2, the electronic device 300 of FIG. 3, the decoder 550 of FIGS. 5A and 5C or any other suitable device or system. For ease of explanation, the flowchart 650 is described as being performed by the decoder 550.

In step 602, the encoder 510 generates the geometry frames from a point cloud. After the encoder 510 receives a point cloud, such as the point cloud of FIG. 4A. The encoder 510 take different projections, such as described above in FIG. 4B to generate the geometry frame of FIG. 4C.

In step 604, the encoder 510 compresses the geometry frames. The frames can be compressed using an encoding engine such as the encoding engine 522c of FIG. 5B. Thereafter, in step 606 the encoder 510 decompresses the geometry frames. In step 608, the encoder 510 reconstructs the geometry of the point cloud. It is noted that the geometric position of the points of the point cloud could have shifted due to the compression and decompression of steps 604 and 606.

In step 610a, the encoder 510 determines whether to generate the attribute frames based on the reconstructed geometry. In certain embodiments, if the encoder 510 knows that the decoder 550, which will reconstruct and render the point cloud for a user to view, will use the same geometry smoothing parameters and techniques as the encoder 510 will use, then the encoder 510 can determine not to use the reconstructed geometry to generate the attribute frames. Rather the encoder in step 610b determines whether geometry smoothing is enabled. If geometry smoothing is enabled then in step 612, the encoder 510 performs the geometry smoothing.

After the encoder 510 performs the geometry smoothing, the encoder 510 at step 614a performs a first attribute transfer step to generate the attribute frames. The first attribute transfer step matches the attribute information of the points of the original point cloud to the current geometric position of the points. It is noted that the original geometric position of the points and the current geometric position of the points may be different since the geometric positions of some of the points could have shifted due to the generation of the frames, the compression and subsequent decompression of the frames, the reconstruction of the point cloud from the compressed and decompressed frames, and the geometry smoothing of the reconstructed point cloud. After the first attribute transfer is performed, such that the attributes of the original point cloud can be applied to the shifted points of the reconstructed and smoothed points, the attributes frames are generated. In step 616, the encoder 510 compresses the attribute frames. The encoder in step 618 generates a bitstream that includes the compressed geometry frames, of step 604, the compressed attribute frames (which are based on the smoothed geometry), of step 616. The generated bitstream of step 618 can be similar to the bitstream of FIG. 5B.

Alternatively, in step 610a the encoder 510 can determine to use the reconstructed geometry to generate the attribute frames for attribute generation. In certain embodiments the encoder 510 determines to use the reconstructed geometry to generate the attribute frames for attribute generation when the encoder 510 does not know whether the decoder 550 will perform the same geometry smoothing as performed in the encoder. As such the encoder 510 would perform the first attribute transfer and generate the attribute frames in step 614b without performing the geometry smoothing (of step 612). The step 614b is similar to the step 614a but for the state that the reconstructed point cloud. The state of the reconstructed point cloud is either smoothed or unsmoothed. As discussed above, the first attribute transfer step matches the attribute information of the points of the original point cloud to the current geometric position of the points (the unsmoothed point cloud). It is noted that the original geometric position of the points and the current geometric position of the points may be different since the geometric positions of some of the points could have shifted due to the generation of the frames, the compression and subsequent decompression of the frames, and the reconstruction of the point cloud from the compressed and decompressed frames. After the first attribute transfer is performed, such that the attributes of the original point cloud can be applied to the shifted points of the reconstructed points, the attributes frames are generated. In step 616, the encoder 510 compresses the attribute frames. The encoder in step 618 generates a bitstream that includes the compressed geometry frames, of step 604, the compressed attribute frames (which are based on the reconstructed geometry), of step 616. The generated bitstream of step 618 can be similar to the bitstream of FIG. 5B.

The flowchart 650 of FIG. 6B describes the decoder 550 reconstructing the point cloud for rendering and display. In step 652, the decoder 550 receives the bitstream that was generated in FIG. 6A. In step 654, the decoder 550 decompresses the frames that are included in the bitstream. In step 656, the decoder 550 reconstructs the geometry of the point cloud from the geometry frames.

In step 658, the decoder 550 determines whether to perform geometry smoothing, based on whether geometry smoothing is enabled. In certain embodiments, the decoder 550 determines not to perform geometry smoothing based on a received indication that is included in the bitstream. When it is determined not to perform geometry smoothing, in step 660, the decoder 550 applies the attributes (if any) to the reconstructed point cloud. Since the attribute frames were based on the reconstructed geometry (not the smoothed geometry) an attribute transfer step is not needed.

When it is determined to perform geometry smoothing, based on whether geometry smoothing is enabled, the decoder in step 662 performs geometry smoothing. In certain embodiments, the geometry smoothing engine which performs the geometry smoothing could be the same or different than the geometry smoothing engine of the encoder. In certain embodiments, based on whether the geometry smoothing engine, which performed the geometry smoothing at the encoder 510, is the same or different than the geometry smoothing engine of the decoder 550, indicates whether the decoder 550 will determine whether to perform the attribute transfer in step 664.

When the geometry smoothing engine of the encoder 510 is the same as the geometry smoothing engine of the decoder

550, as indicated by the value of the syntax element, the decoder 550 does not perform geometry smoothing. As such, in step 660 the decoder 550 applies the attributes (if any) to the reconstructed point cloud. Since the attribute frames, when originally generated at the encoder 510, were based on the smoothed reconstructed geometry, the decoder 550 can apply the attribute information of to the smoothed reconstructed geometry in step 660.

The decoder 550 either skips the attribute transfer step or performs the attribute transfer step based on the syntax element included in the bitstream. In certain embodiments, when geometry smoothing is enabled at the decoder and syntax element (which is identified from the bitstream) is 1, but the decoder uses a different geometry smoothing than the one recommended, then the decoder should perform attribute transfer step even though the syntax element is 1. That is, since the points of the smoothed reconstructed point cloud at the decoder 550 could be at slightly different locations than points of the point cloud such as when the attribute frames were originally generated at the encoder 510, the second attribute transfer step is performed in step 666 to match the attribute information with the actual location of the points. After performing the second attribute transfer step at step 666, the decoder 550 then applies the attributes to the reconstructed point cloud in step 660.

In certain embodiments, after the attributes are applied to the reconstructed point cloud in step 660, the decoder 550 can smooth the attributes of the point cloud. For example, the decoder 550 can perform attribute smoothing to increase the visual quality of the reconstructed point cloud. The decoder 550 can then render the point cloud on a display. In other embodiments, the decoder 550 does not smooth the attributes of the point cloud. That is, the decoder 550 can render the point cloud on a display after step 660.

Although FIGS. 6A and 6B illustrates example flowcharts, various changes may be made to FIGS. 6A and 6B. For example, while shown as a series of steps, various steps, such as in FIGS. 6A and 6B could overlap, occur in parallel, occur in a different order, or occur multiple times. In another example, steps may be omitted or replaced by other steps.

Figure 7:
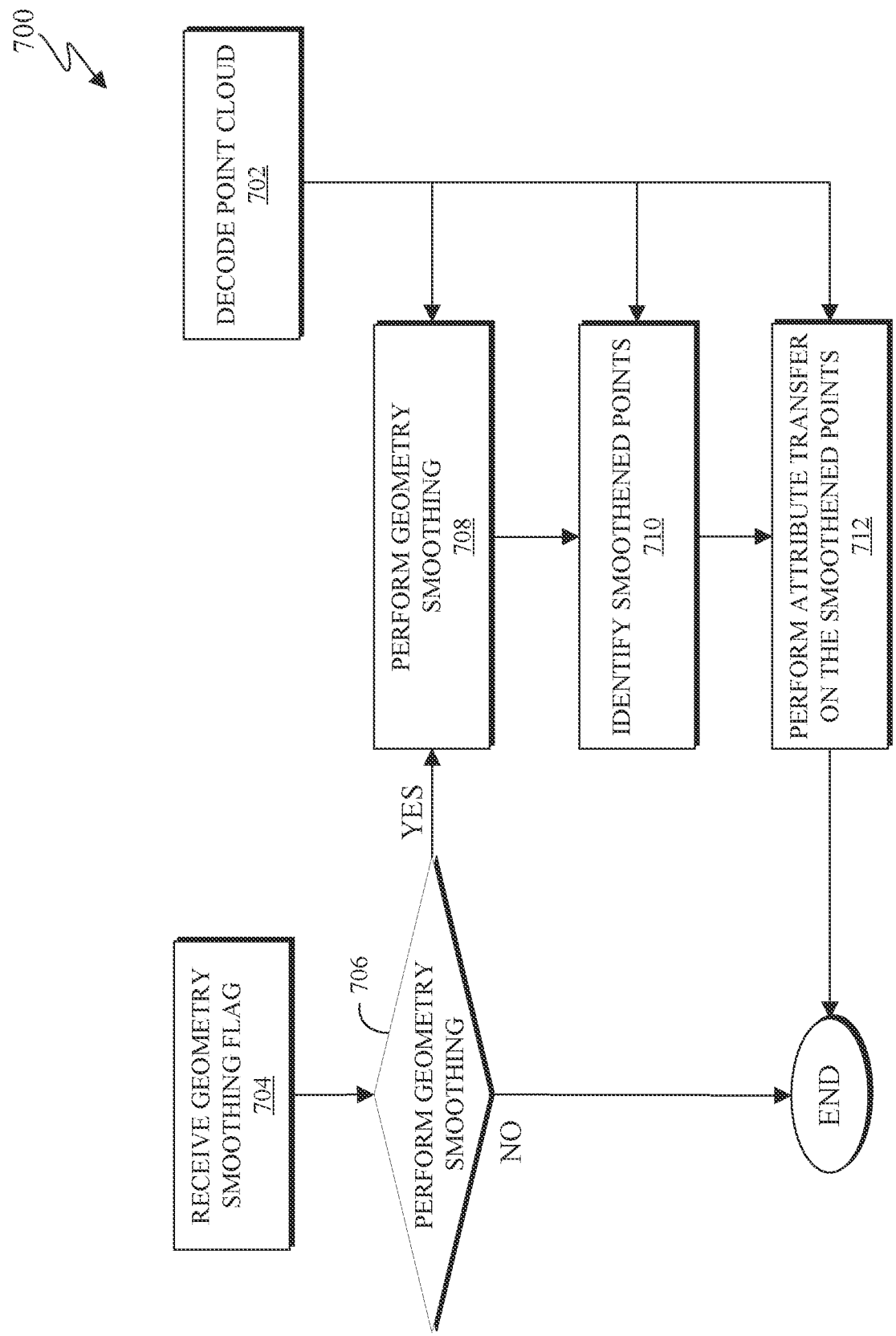
FIG. 7 illustrates an example method for performing attribute transfer while decoding a point cloud in accordance with an embodiment of this disclosure.

FIG. 7 illustrates an example method 700 for performing attribute transfer while decoding a point cloud in accordance with an embodiment of this disclosure. The method 700 can be performed by the server 104 or any of the client devices 106-116 of FIG. 1, the server 200 of FIG. 2, the electronic device 300 of FIG. 3, the decoder 550 of FIGS. 5A and 5C or any other suitable device or system.

The second attribute transfer step, when performed by the decoder 550, such as one of the client devices of FIG. 1, is computationally complex which can reduce the overall user experience. As discussed above the second attribute transfer step is performed when the decoder 550 applies the attributes (that were generated based on the reconstructed point cloud) to the reconstructed point cloud that has been geometrically smoothed, and as such, the points are no longer in the same position which could cause certain points to not have a color applied to them reducing the visual quality of the point cloud when rendered. The method 700 describes a method to decrease the computational complexity by performing the second attribute transfer for only certain points of the 3D point cloud.

A fraction of the points of a point cloud might move or new points might be added to the decoded point cloud due to the compression, decompression, reconstruction and smoothing of the reconstructed point cloud. Therefore, instead of performing attribute transfer on all of the points of the point cloud, only the attribute (e.g. color) for the affected points or new points need to be determined through the attribute transfer process at the decoder 550.

In step 702, the decoder 550 decodes a point cloud. The decoder 550 can reconstruct the geometry of the point cloud based on the decoded geometry frames. In step 704, the decoder 550 receives a geometry smoothing flag. The geometry smoothing flag indicates whether the decoder 550 should perform geometry smoothing to the reconstruct points in 3D space.

In step 706, the decoder 550 determines whether to perform geometry smoothing to the reconstruct points in 3D space. When the geometry smoothing flag indicates not to perform geometry smoothing, the decoder 550 can apply the attribute information (if any) to the reconstruct points in 3D space and then render the 3D point cloud. That is, no secondary attribute transfer is performed to the point cloud.

Alternatively, when the geometry smoothing flag (that was received in step 804) indicates that the geometry smoothing is to be performed, the decoder 550 in step 708, performs the geometry smoothing. In step 710 the decoder 550 then identifies points in the smoothed point cloud whose positions have been shifted with respect to the corresponding points in the reconstructed point cloud. As such, the attribute transfer step is performed prior to adding the attribute information to the points of the reconstructed and smoothed point cloud. In step 712, the decoder 550 performs the attribute transfer only on the identified points of step 710 (which were smoothed in step 708). After the attribute transfer is performed, the decoder 550 can perform attribute smoothing to further improve the visual quality of the point cloud. In certain embodiments, after step 712 is performed, the decoder 550 can output the reconstructed point cloud. The decoder 550 can also render the reconstructed 3D point cloud. FIGS. 8A-14 describe different methods for identifying certain points of the reconstructed and smoothed point cloud that shifted, and different methods for performing the attribute transfer.

Although FIG. 7 illustrates an example method 700, various changes may be made to FIG. 7. For example, while shown as a series of steps, various steps, such as in FIG. 7 could overlap, occur in parallel, occur in a different order, or occur multiple times. In another example, steps may be omitted or replaced by other steps.

Figure 8A:
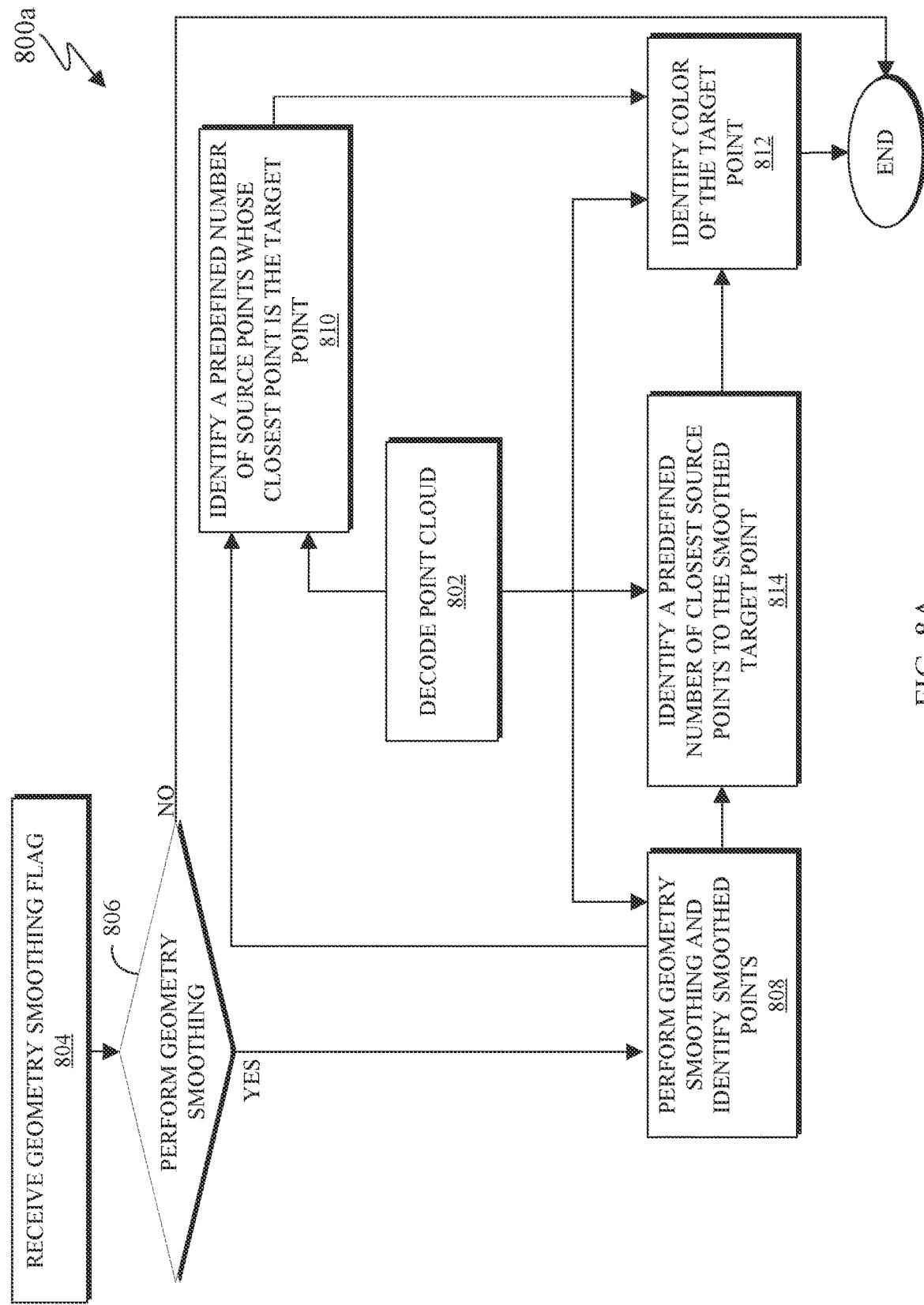
FIGS. 8A and 8B illustrate example methods for performing attribute transfer while decoding a point cloud in accordance with an embodiment of this disclosure.
Figure 8B:
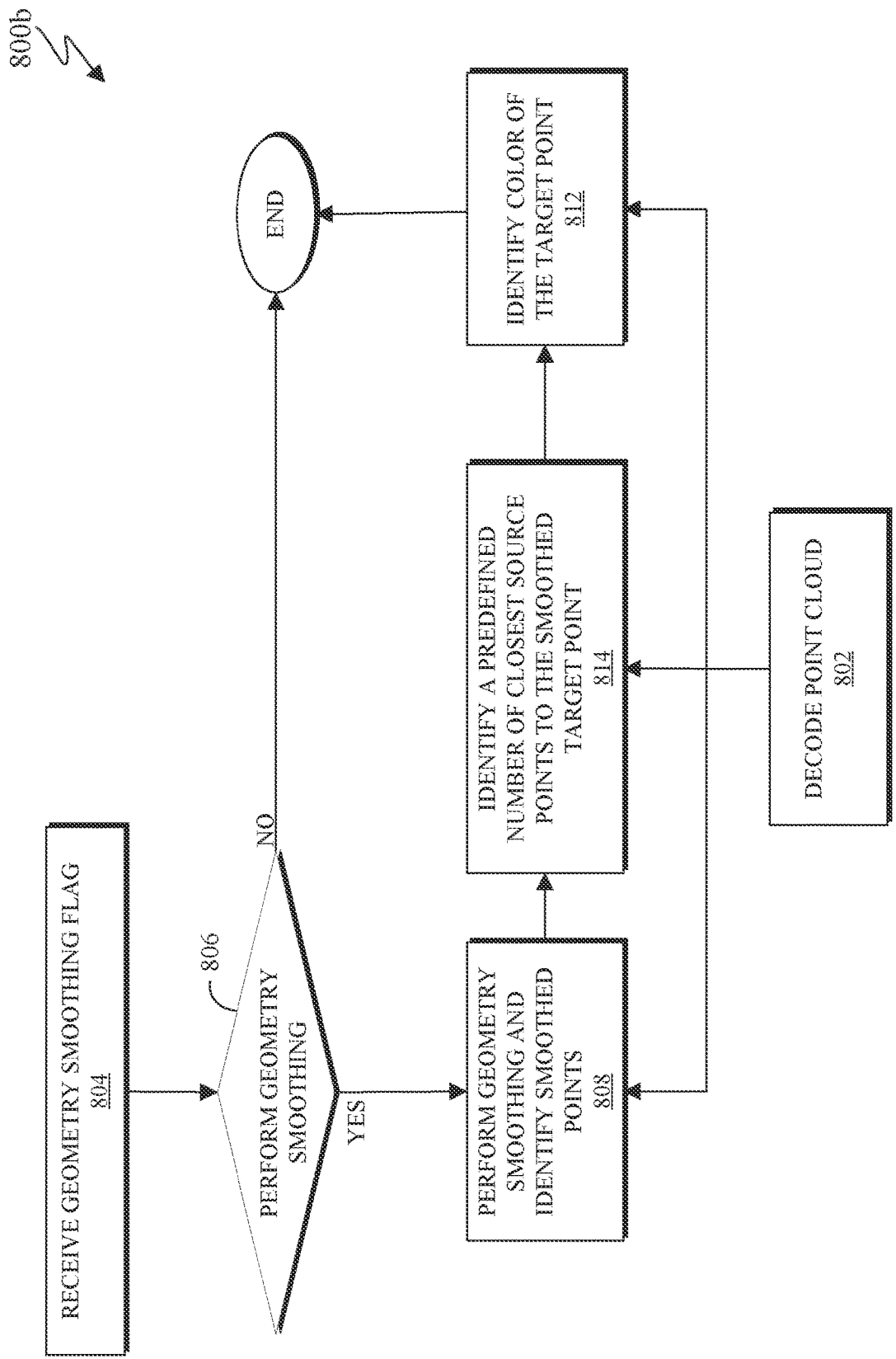
Figure 8C:
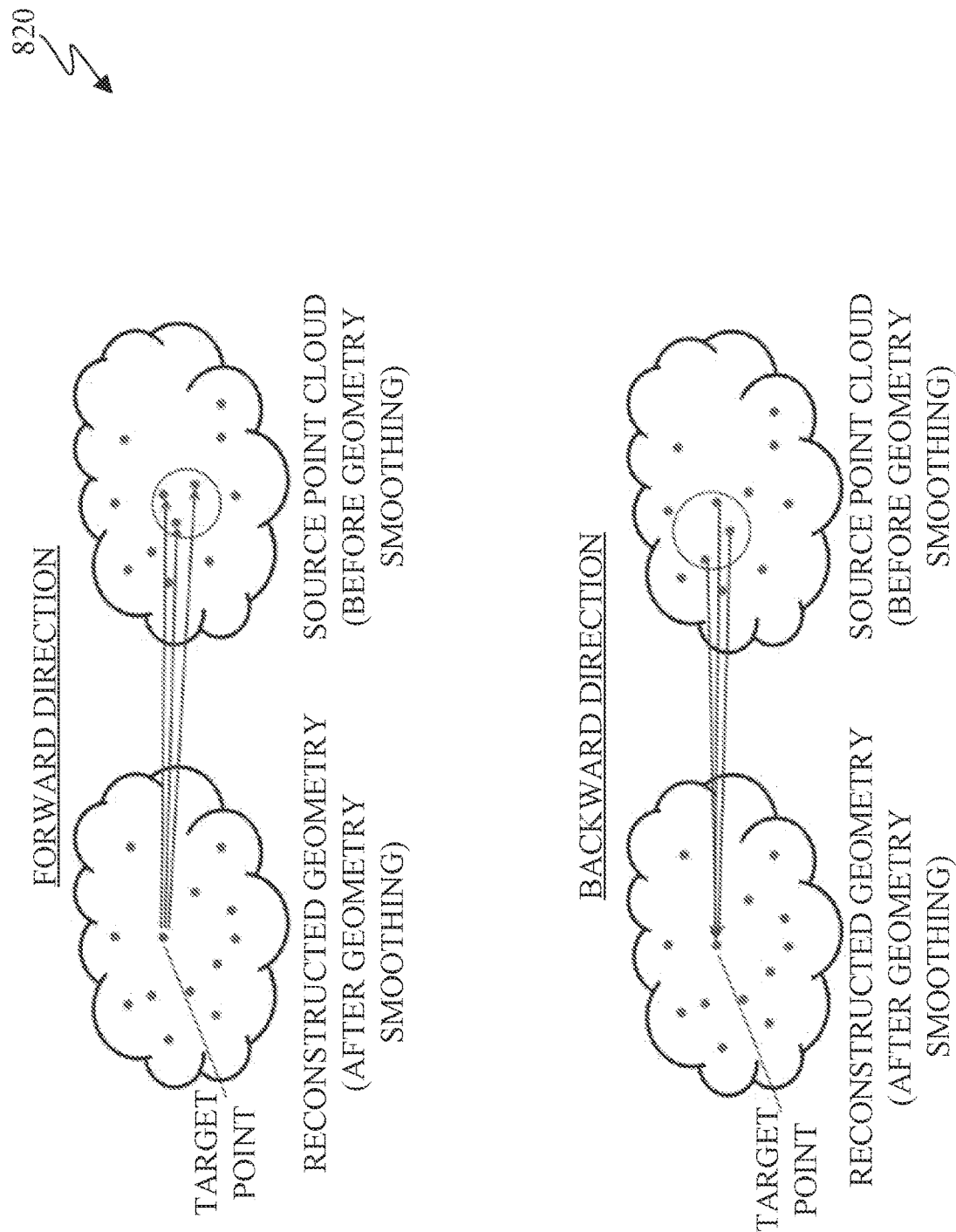
FIGS. 8C and 8D illustrate diagrams describing forward searching and backward searching in accordance with an embodiment of this disclosure.
Figure 8D:
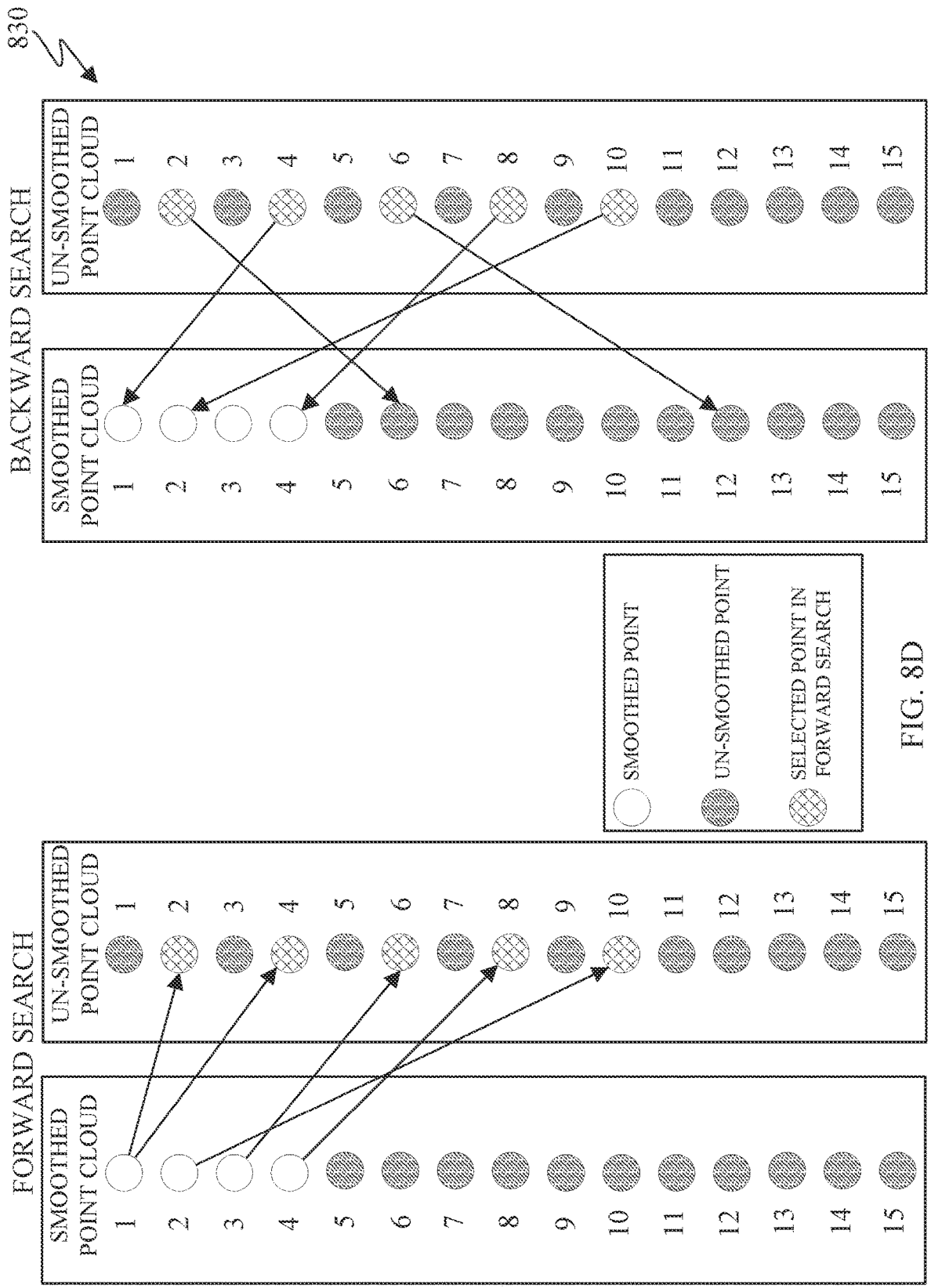
Figure 9:
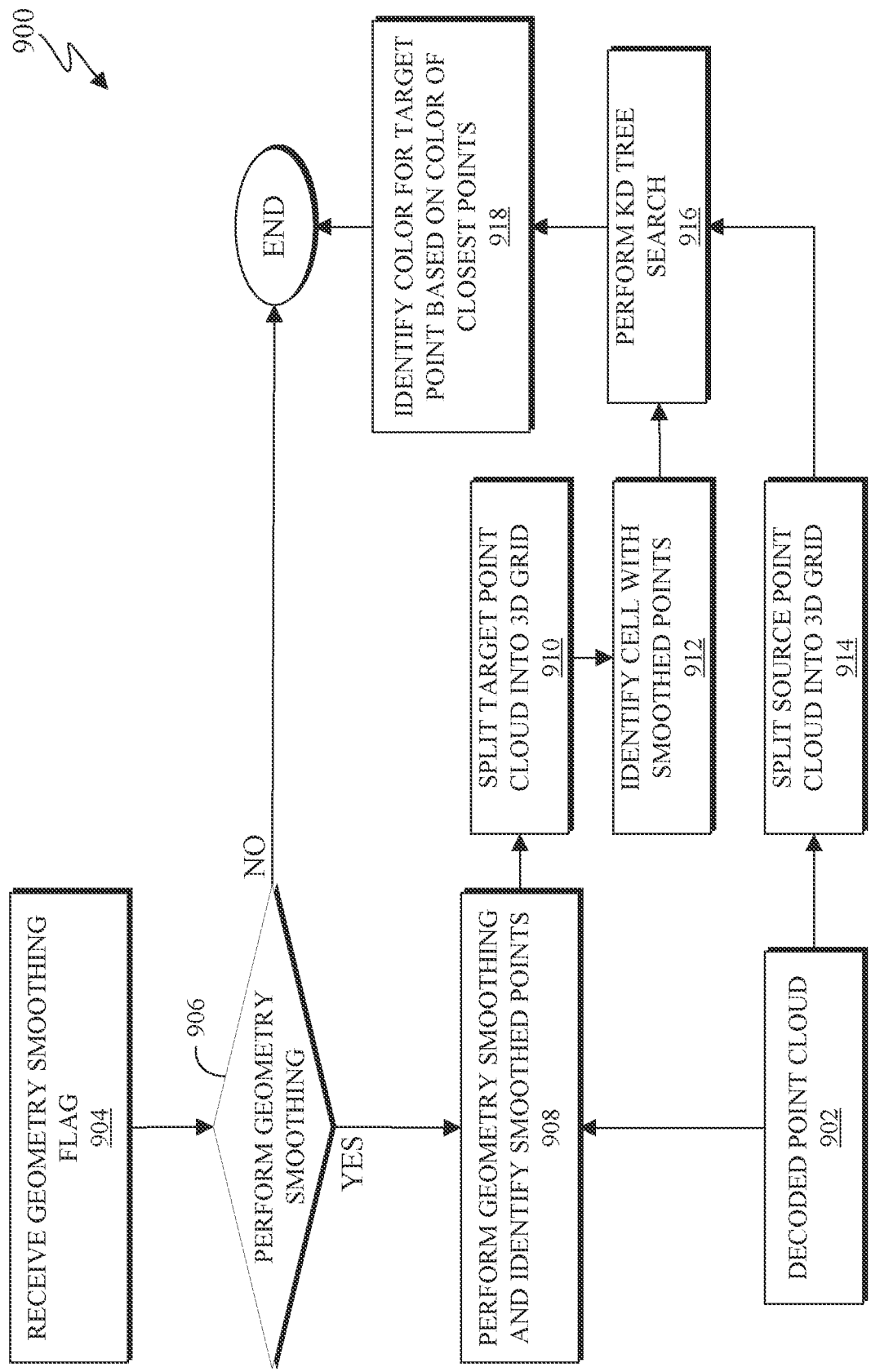
FIGS. 9, 10, 11, 12, 13, and 14 illustrate example methods for performing attribute transfer while decoding a point cloud in accordance with an embodiment of this disclosure.
Figure 10:
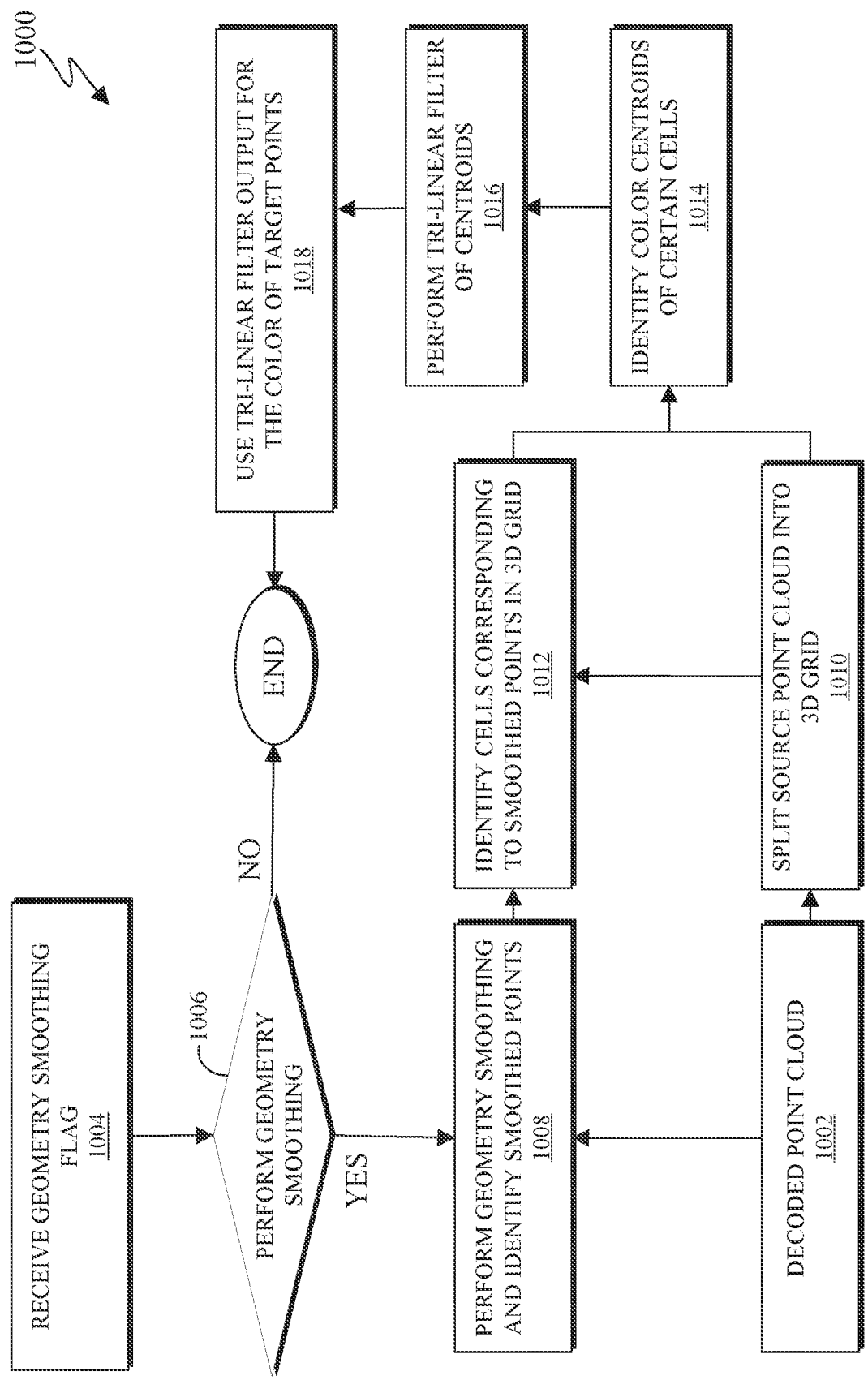
Figure 11:
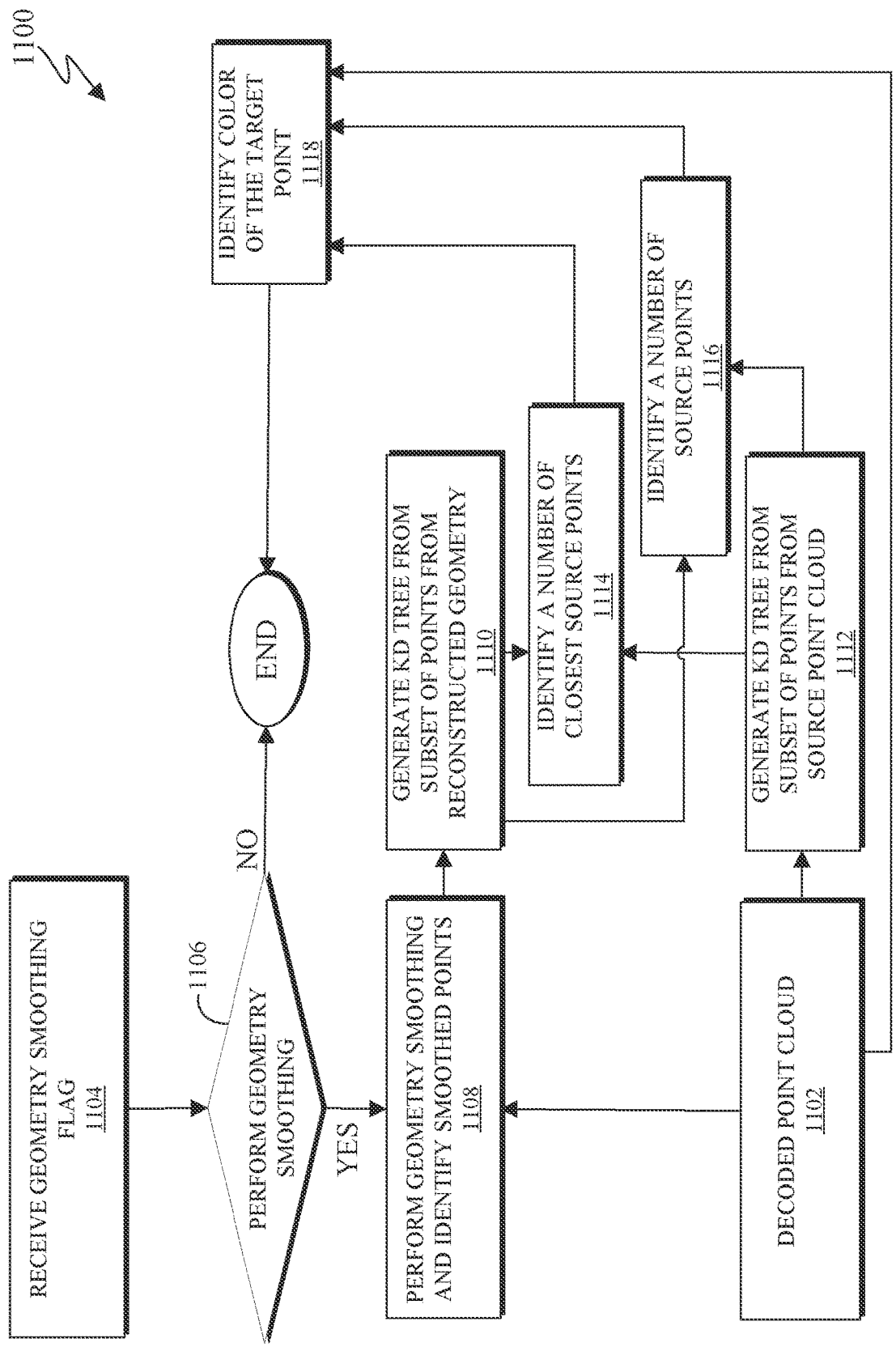
Figure 12:
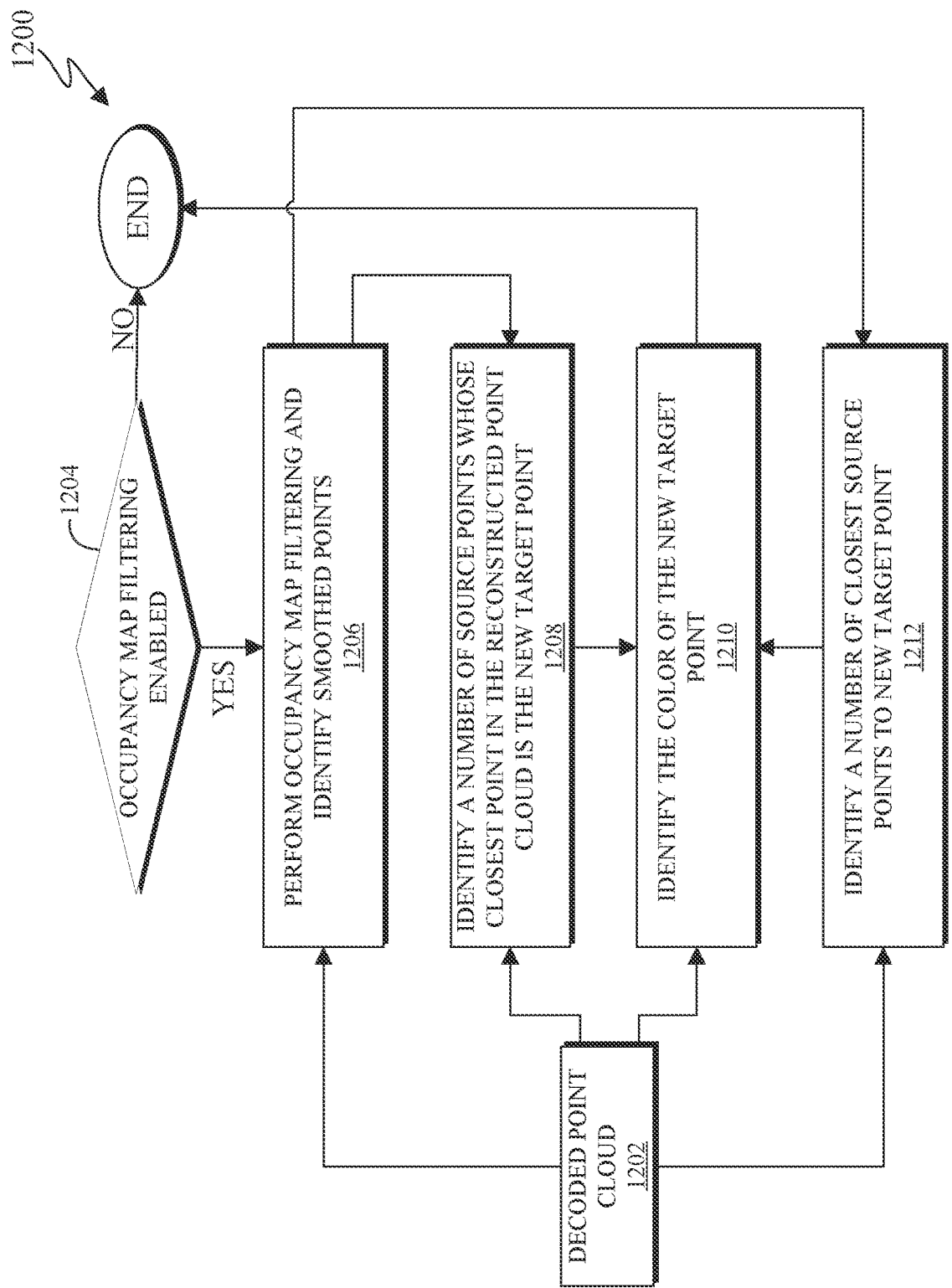
Figure 13:
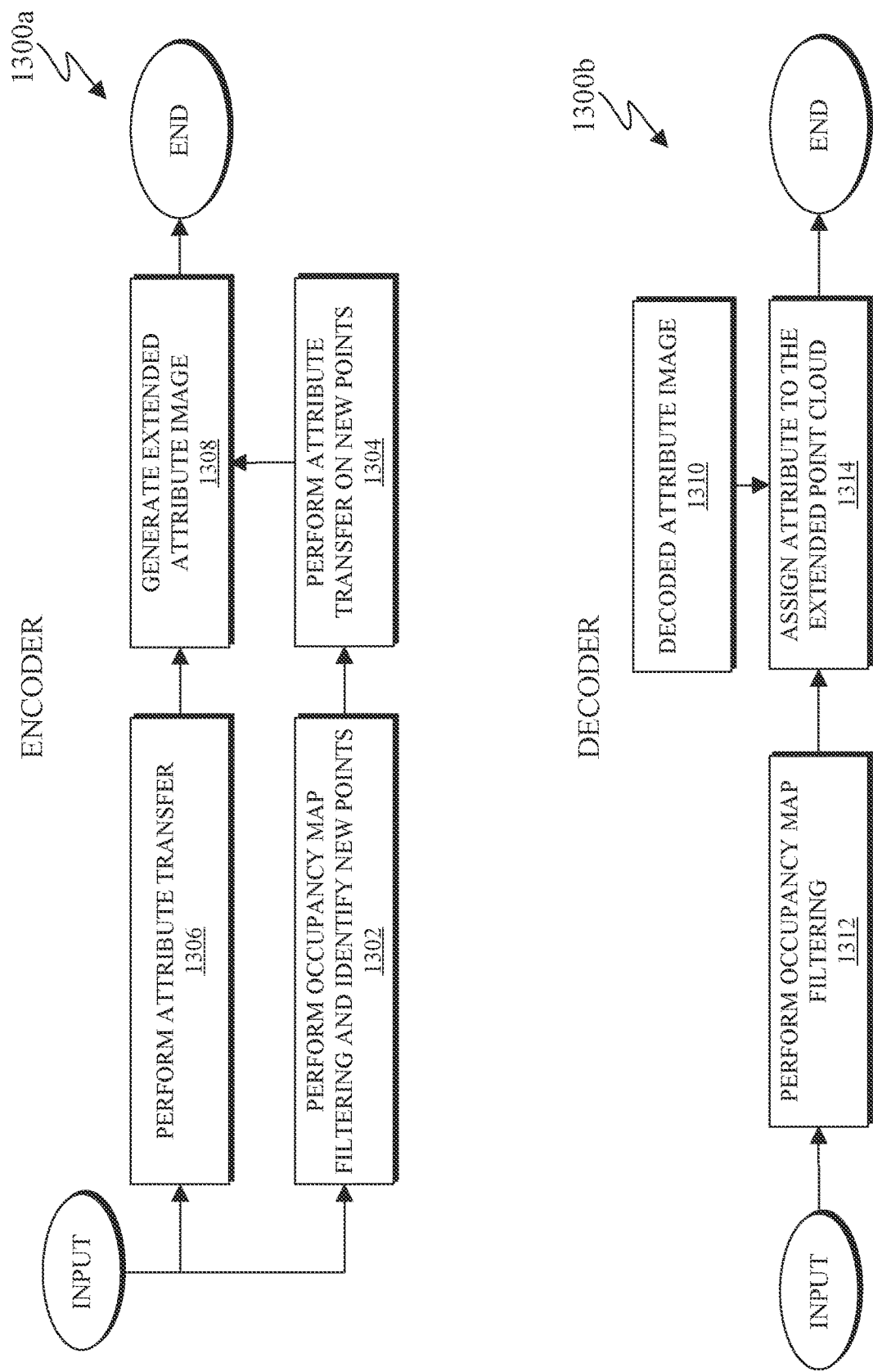
Figure 14:
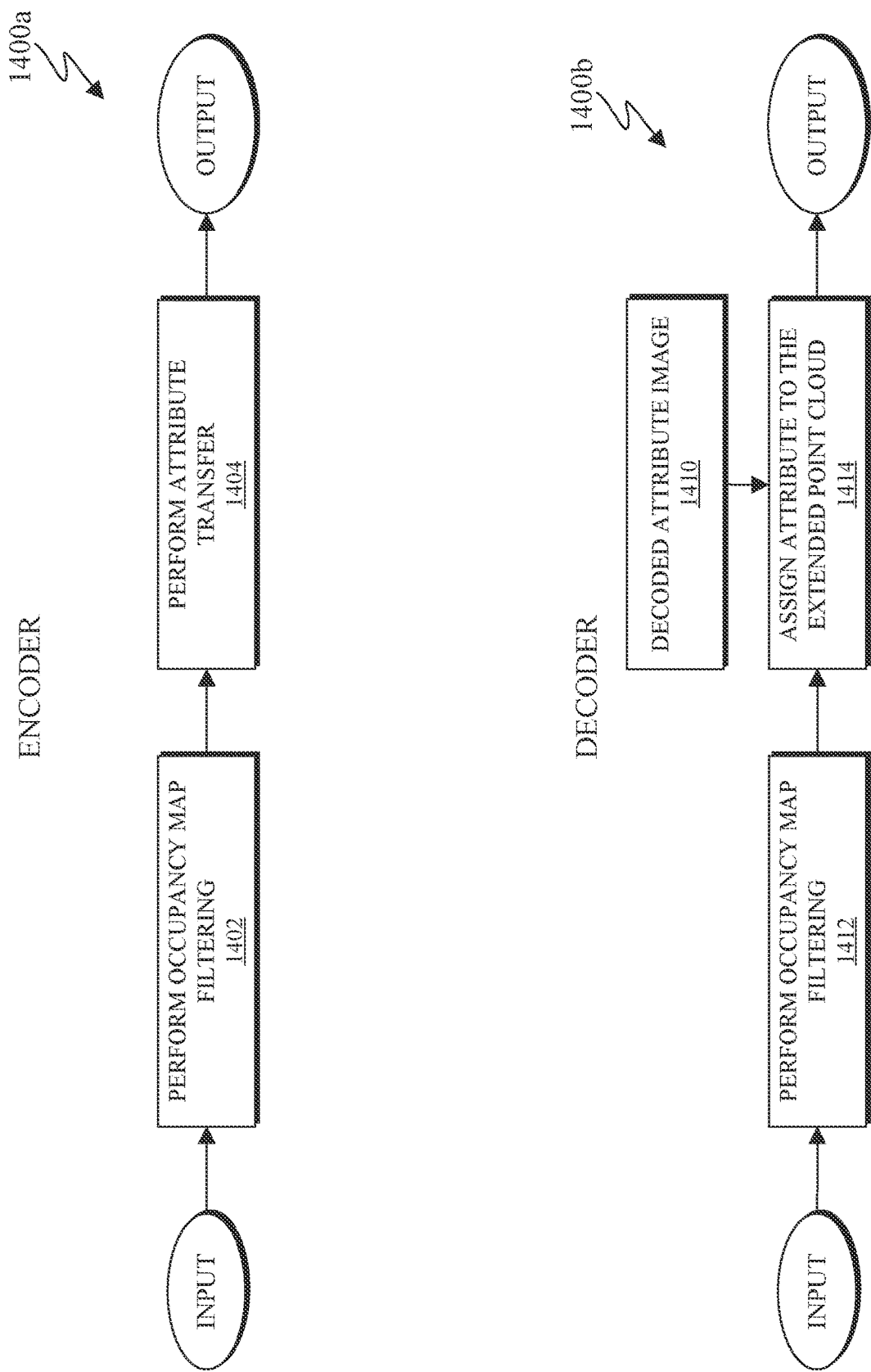

FIGS. 8A, 8B, 9, 10, 11, 12, 13, and 14 illustrate example methods for performing attribute transfer while decoding a point cloud in accordance with an embodiment of this disclosure. In particular, FIG. 8A, illustrates the method 800a, FIG. 8B, illustrates the method 800b, FIG. 9, illustrates the method 900, FIG. 10 illustrates the method 1000, FIG. 11 illustrates the method 1100, FIG. 12 illustrates the method 1200, FIG. 13 illustrates the methods 1300a, 1300b, and FIG. 14 illustrates the methods 1400a, and 1400b. FIGS. 8C and 8D illustrates diagrams 820 and 830, respectively, which forward searching and backward searching in accordance with an embodiment of this disclosure. These methods and diagrams can be performed by the server 104 or any of the client devices 106-116 of FIG. 1, the server 200 of FIG. 2, the electronic device 300 of FIG. 3, the decoder 550 of FIGS. 5A and 5C or any other suitable device or system.

The method 800a of FIG. 8A and the method 800b of FIG. 8B describe example processes for performing the second attribute transfer. As discussed above, the second attribute transfer process occurs when an encoder generates the attribute frames based on the reconstructed point cloud (not the smoothed reconstructed point cloud) and the decoder when reconstructing the point cloud, performs geometry smoothing to the geometric points prior to applying the color to the points. It is noted that geometry smoothing usually affects only a small fraction of the input points, mainly points that correspond to pixels near patch boundaries of the geometry frame.

As such, the method 800a describes a process for performing the second attribute transfer (color transfer) only on the points which are affected by the geometry smoothing. Since only a small percentage of the points get smoothed, by enforcing this constraint on the secondary attribute transfer, the complexity of the attribute transfer is reduced significantly. This, in turn, reduces the complexity of the decoder 550. As described in greater detail below with respect to the method 800a of FIG. 8A, the decoder 550 identifies points whose 3D coordinates (geometry) changes due to geometry smoothing process. This information about these smoothed points is passed to the secondary attribute transfer stage. The decoder then performs attribute transfer only on the smoothed points (the points whose 3D coordinates have changed due to geometry smoothing). In this case, forward and backward search is performed only on the smoothed points. FIGS. 8C and 8D describe the forward and backward search in greater details In step 802 the decoder 550 decodes a point cloud. The decoder 550 can reconstruct the geometry of the point cloud based on the decoded geometry frames. In step 804, the decoder 550 receives a geometry smoothing flag. The geometry smoothing flag indicates whether the decoder 550 should perform geometry smoothing to the reconstruct points in 3D space.

In step 806, the decoder 550 determines whether to perform geometry smoothing to the reconstruct points in 3D space. When the geometry smoothing flag (that was received in step 804) indicates not to perform geometry smoothing, the decoder 550 can apply the attribute information (if any) to the reconstruct points in 3D space and then render the 3D point cloud. That is, no secondary attribute transfer is performed to the point cloud.

Alternatively, when the geometry smoothing flag (that was received in step 804) indicates that the geometry smoothing is to be performed, the decoder 550 in step 808, performs the geometry smoothing. The decoder 550 in step 808 also identifies the smoothed points (the points that shifted during the smoothing process).

In step 810, the decoder performs the forward search and in step 814 the decoder performs the backwards search. The forward search and backward search are based on a smoothed point that shifted during the geometry smoothing. The shifted point is referred to as a target point. Stated differently, the target point is an identified point that shifted when the reconstructed geometry was smoothed. FIGS. 8C and 8D illustrate the forward and backwards search. In step 810, the decoder 550 identifies a predefined number of source points whose closest point is the target point. In step 814, the decoder 550 identifies a predefined number of closest source points to the smoothed target point. It is noted that the source point refers to the points of the reconstructed point cloud before geometry smoothing and the target point refers to the points of the reconstructed point cloud after geometry smoothing.

That is, the forward search (of step 810) identifies a predefined number of points in the reconstructed point cloud that are closest to the selected target point. This forward search is performed only for the points affected by geometry smoothing. Whereas backward search (of step 814) identifies a predefined number of points in the smoothed point cloud that are closest to a selected point from the unsmoothed reconstructed point cloud.

In step 812, the decoder 550 identifies the attribute of the target point based on the results of the forward search (of step 810) and the backward search (of step 814). For example, for the target point, a weighted average of the attributes of the points that have been selected in the forward search (of step 810) and the backward search (of step 814). The selected points from the forward search (of step 810) and the backward search (of step 814) can be considered the closest points to the target point. The weighted average of these points will be assigned as the attribute to the target point. The method 800a is repeated for each point that is shifted during the geometry smoothing. Thereafter, in certain embodiments, the decoder 550 can output the reconstructed point cloud.

In certain embodiments, the method 800a can include additional steps such as receiving a backward search flag (or syntax element, such as an SEI message) and then determining whether to skip the backward search based on the value of the flag. That is, based on the value of the flag, the decoder 550 can determine whether the backward search should be performed during secondary attribute transfer. In other embodiments, the flag (or syntax element, such as an SEI message) the flag may be used for other purposes such as choosing between two different secondary attribute transfer methods or choosing different sets of parameters for secondary attribute transfer. The flag can be signaled for each point cloud sequence or point cloud frame. Similarly, the syntax element, such as an SEI message can persist till it is explicitly cancelled and/or a new SEI message is sent.

The method 800b of FIG. 8B is similar to the method 800a of FIG. 8A, except that the method 800b does not perform for the backward (step 810) of the method 800a. For example, similar to the method 800a, the method 800b performs the attribute transfer only on the points which are affected by the geometry smoothing.

In the method 800b the decoder 550 identify points whose 3D coordinates (geometry) are affected due to geometry smoothing process (step 808). The decoder 550 then passes this information about these smoothed points to the secondary attribute transfer stage (steps 812 and 814). Performs attribute transfer only on the smoothed points (the points whose 3D coordinates have changed due to geometry smoothing). In this case, attribute transfer performs only forward search.

The method 900 of FIG. 9 describes another method for performing attribute transfer instead of using the forward and backward search of FIGS. 8A-8C. In particular, the method 900 performs a Kd-tree search on a small group of points inside a cell. It is noted that the method 900 less computationally complex as compared to the method 800a of FIG. 8A, since the method 900 uses is performed on points in small cells. However the method 900 may be less accurate than the method 800a since points in neighboring cells will be excluded from the cell specific kd-tree search.

In general, the method 900 splits the reconstructed geometry and the source point cloud into 3D grids. The decoder 550 identifies a cell that contains a target point (a smoothed point). The decoder 550 performs a small kd-tree search in a corresponding cell in the grid of the source point cloud to find a pre-defined number of closest points to the target point (smoothed point). In certain embodiments, the decoder 550 assigns the attribute of the closest point to the target point. In other embodiments, the average, weighted average or the median of the attributes of a few closest points to the target point may be used to assign attribute to the target point.

In step 902 the decoder 550 decodes a point cloud. The decoder 550 can reconstruct the geometry of the point cloud based on the decoded geometry frames. In step 904, the decoder 550 receives a geometry smoothing flag. The geometry smoothing flag indicates whether the decoder 550 should perform geometry smoothing to the reconstruct points in 3D space.

In step 906, the decoder 550 determines whether to perform geometry smoothing to the reconstruct points in 3D space. When the geometry smoothing flag (that was received in step 904) indicates not to perform geometry smoothing, the decoder 550 can apply the attribute information (if any) to the reconstruct points in 3D space and then render the 3D point cloud. That is, no secondary attribute transfer is performed to the point cloud.

Alternatively, when the geometry smoothing flag (that was received in step 904) indicates that the geometry smoothing is to be performed, the decoder 550 in step 908, performs the geometry smoothing. The decoder 550 in step 908 also identifies the smoothed points (the points that shifted during the smoothing process).

In step 910 the decoder 550 splits the target point cloud into a 3D grid (denoted as source grid). Similarly, in step 914, the decoder 550 splits the source point cloud into a 3D grid (denoted as target grid). The size and shape of each cell of the source grid and the target grid are the same.

In step 912, the decoder 550 identifies a cell of the target grid that includes a target point. A target point is a point that was smoothed by the geometry smoothing of step 908. The decoder then performs a kd-search between the cell of the target grid and a corresponding cell of the source grid. It is noted that the cell of the target grid and a corresponding cell of the source grid correspond to cells located in the same position in each respective grid.

In step 918, the decoder 550 identifies a color for the target point based on the color of the closest points found by the kd-tree search. In certain embodiments, the identified color could be the color value of the closest point. In other embodiments, the identified color could be based on an average of all of the points found in the kd-tree search. In yet other embodiments, the identified color could be based on a weighted average or median of all of the points found in the kd-tree search. In certain embodiments, after step 918 is performed, the decoder 550 can output the reconstructed point cloud.

The method 1000 of FIG. 10 describes yet another method for performing attribute transfer. The method 1000 is similar to the method 900 but does not use a kd-tree search. Rather the method 1000 identifies a centroid value of a corresponding cell. In general, in the method 1000 the decoder 550 constructs a 3D grid from source point cloud. The decoder 550 then identifies the cell corresponding to the target point. The decoder 550 then finds the color centroids for the cell corresponding to target points and a pre-defined number of neighboring cells. The decoder 550 then applies a tri-linear filter to the color centroids of the selected cells. Finally the decoder 550 uses the output of the trilinear filter for the color of the target point.

In step 1002 the decoder 550 decodes a point cloud. The decoder 550 can reconstruct the geometry of the point cloud based on the decoded geometry frames. In step 1004, the decoder 550 receives a geometry smoothing flag. The geometry smoothing flag indicates whether the decoder 550 should perform geometry smoothing to the reconstruct points in 3D space.

In step 1006, the decoder 550 determines whether to perform geometry smoothing to the reconstruct points in 3D space. When the geometry smoothing flag (that was received in step 1004) indicates not to perform geometry smoothing, the decoder 550 can apply the attribute information (if any) to the reconstruct points in 3D space and then render the 3D point cloud. That is, no secondary attribute transfer is performed to the point cloud.

Alternatively, when the geometry smoothing flag (that was received in step 1004) indicates that the geometry smoothing is to be performed, the decoder 550 in step 1008, performs the geometry smoothing. The decoder 550 in step 1008 also identifies the smoothed points (the points that shifted during the smoothing process).

In step 1010 the decoder 550 splits the target point cloud into a 3D grid (denoted as source grid). Similarly, in step 1012, the decoder 550 splits the source point cloud into a 3D grid (denoted as target grid) and identifies a cell corresponding to a smoothed point. The size and shape of each cell of the source grid and the target grid are the same. In step 1014 the decoder 550 identifies the color centroid for the cells corresponding to the smoothed points and the neighboring cells. In step 1016 the decoder 550 performs a tri-linear filtering of color centroids of selected cells for each smoothed point. The decoder 550 in step 1018 the assigns the filter output as the color value of the target point. The method 1000 can be repeated for each point that is shifted during the geometry smoothing. Thereafter, the decoder 550 can output the reconstructed point cloud.

The method 1100 of FIG. 11 describes yet another method for performing attribute transfer. The method 1100 uses a kd-tree structure for each of the points near a batch boundary. It is noted that the method 1100 is similar to the method 900 of FIG. 9. For example, instead of forming kd-tree using all points, the method 1100 uses a subset of all points from the source point cloud and the target point cloud. This subset of points for each source and target point cloud are the points near the patch boundaries. The assertion here is that the closest points to the smoothed points are most likely located near patch boundaries. It can be assumed that a smoothed point near a patch boundary will not have its closest points far from patch boundaries.

In step 1102 the decoder 550 decodes a point cloud. The decoder 550 can reconstruct the geometry of the point cloud based on the decoded geometry frames. In step 1104, the decoder 550 receives a geometry smoothing flag. The geometry smoothing flag indicates whether the decoder 550 should perform geometry smoothing to the reconstruct points in 3D space.

In step 1106, the decoder 550 determines whether to perform geometry smoothing to the reconstruct points in 3D space. When the geometry smoothing flag (that was received in step 1104) indicates not to perform geometry smoothing, the decoder 550 can apply the attribute information (if any) to the reconstruct points in 3D space and then render the 3D point cloud. That is, no secondary attribute transfer is performed to the point cloud.

Alternatively, when the geometry smoothing flag (that was received in step 1104) indicates that the geometry smoothing is to be performed, the decoder 550 in step 1108, performs the geometry smoothing. The decoder 550 in step 1108 also identifies the smoothed points (the points that shifted during the smoothing process).

In step 1110, the decoder 550 generates a kd-tree from a subset of the points from the reconstructed geometry. In step 1112, the decoder 550 generates another kd-tree from the subset of points from the source point cloud. in step 1114, the decoder 550 identifies a predefined number of closest source points to the smoothed target point, based on the kd-tree of steps 1110 and 1112. Similarly, in step 1116, the decoder 550 identifies a predefined number of source points whose closest point in the reconstructed point cloud is the smoothed target point.

In step 1118, the decoder identifies the color of the target point based on the steps 1114, 1116 and the decoded point cloud of step 1102. In certain embodiments, the decoder 550 assigns the color of the closest point to the target point. In other embodiments, the average, weighted average or the median of the colors of a few closest points to the target point may be used to assign color to the target point. The method 1100 is repeated for each point that is shifted during the geometry smoothing. Thereafter, the decoder 550 can output the reconstructed point cloud.

The method 1200 of FIG. 12 describes yet another method for performing attribute transfer. The method uses the occupancy map to find new points to the decoded point cloud to help fill in holes in the reconstructed point cloud and thereby improve the visual quality. In general, in the method 1200 performs an occupancy map processing on the decoded point cloud. The method also Identify the new points in the point cloud and then identifies an attribute value for the new points through an attribute transfer process. In certain embodiments, the occupancy map processing can be followed by a geometry smoothing process, in which case attribute transfer is performed on new points as well as points affected by geometry smoothing.

In step 1202 the decoder 550 decodes a point cloud. The decoder 550 can reconstruct the geometry of the point cloud based on the decoded geometry frames. In step 1204, the decoder 550 determines whether occupancy map filtering is enabled. When the occupancy map filtering is not enabled, the decoder 550 can apply the attribute information (if any) to the reconstruct points in 3D space and then render the 3D point cloud. That is, no secondary attribute transfer is performed to the point cloud. Alternatively, when the occupancy map filtering is enabled the decoder 550 in step 1206 performs occupancy map filtering and identifies new points. Based on the identification of new points, the decoder 550, in step 1208 identifies a predefined number of source points whose closest point in the reconstructed point cloud is the new target point. Additionally, based on the identification of new points, the decoder 550, in step 1212 identifies a predefined number of closest source points to the new target point.

Based on the identified source points whose closest point in the reconstructed point cloud is the new point (step 1208) and the identified closest source points to the new target point (step 1212) the decoder in step 1210 identifies the color of the new target point. For example, the decoder 550 identifies the color value of the new target point based on a weighted average of the color of the selected points. The decoder 550 in step then the assigns the identified as the color value of to the new point. The method 1200 can be repeated for each new point found in step 1206. Thereafter, the decoder 550 can output the reconstructed point cloud.

The method 1300a of FIG. 13 occurs at the encoder such as the encoder 510 of FIGS. 5A and 5B while the method 1300b of FIG. 13 occurs at the decoder 550 of FIGS. 5A and 5C. On the encoder side, the method 1300a uses an occupancy map filtering to add new points to the point cloud. This process extends the occupancy map at patch boundaries.

It is noted that the methods 1300a and 1300b are similar to the method 1200 of FIG. 12. For example, step 1206 of FIG. 12 and step 1312 of FIG. 13 both perform occupancy map processing on the reconstructed point cloud at the decoder 550. The occupancy map processing (of steps 1206 and 1312) may add new points to the reconstructed point cloud, which could increase the complexity caused by the secondary color transfer. Therefore, the methods of FIG. 13 describe embodiments to reduce the complexity at the decoder 550 caused by the secondary color transfer. For example, the method 1300a performs the occupancy map processing on the encoder side as well, such that the attributes of the new points may be computed by an attribute transfer. The attribute of the new points will be added to the attribute image at the encoder, and after compression will be transmitted to the decoder 550. The method 1300b, describes the decoder 550 where the occupancy map processing will be performed on the decoded point cloud and the attribute of the new points will be obtained from the decoded attribute image. Accordingly, there is no need for a secondary color transfer at the decoder which results in reduced complexity of the decoder.

The method 1300a describes that at the encoder 510 one the attribute transfer is performed (step 1306) before the occupancy map filtering (step 1302), then another attribute transfer is performed after occupancy map filtering (step 1304). Then the attribute of the new points are added to attribute image (step 1308). The method 1300b describes that if the decoder 550 uses any geometry smoothing process that is different than occupancy map filtering which was used at the encoder 510, then an attribute transfer will be performed on the points whose position were changed by the geometry smoothing process. Alternatively, if the decoder 550 is using the same occupancy map filtering as used at the encoder 510, then there is no need to perform an attribute transfer. As such, the attribute for the new points that were added to the point cloud will be obtained from the decoded attribute image. That is, on the decoder side (the method 1300b), if using any geometry smoothing process different than the occupancy map processing which was used at the encoder 510, an attribute transfer will be performed on the points whose position were changed by the geometry smoothing process.

In step 1306, the encoder 510 performs another attribute transfer for all the points of the points cloud. In step 1302, the encoder 510 performs occupancy map filtering and identifies the new points based on the occupancy map filtering. Thereafter, in step 1304, the encoder 510 performs an attribute transfer for the new points based on the identified new points of the occupancy map filtering (of step 1302). In step 1308, the encoder generates an extended attribute frame that includes the attribute points from the first attribute transfer of step 1302 and the attribute transfer of the new points of step 1304.

In step 1310, the decoder 550 decodes the attribute image that was generated by the encoder 510. In step 1312, the decoder 550 performs an occupancy map filtering. If using any geometry smoothing process different than the occupancy map processing which was used at the encoder 510, then in step 1314 the decoder 550 assigns the attributes (from the attribute image that was decoded in step 1310) to the extended point cloud.

The method 1400a of FIG. 14 occurs at the encoder such as the encoder 510 of FIGS. 5A and 5B while the method 1400b of FIG. 14 occurs at the decoder 550 of FIGS. 5A and 5C. It is noted that the occupancy map filtering steps of FIG. 14, which add new points to the point cloud is used by both the encoder 510 (as shown in the method 1400a) and the decoder 550 (as shown in the method 1400b). For example, at the encoder 510 (as described by the method 1400a) the attribute transfer (step 1404) is performed after the occupancy map filtering (step 1402). At the decoder 550 (as described by the method 1400*b*), there is no need to perform any attribute transfer step since the attributes for the point cloud (including the newly added points) is obtained from the decoded attribute frame. That is, the decoder can still use any geometry smoothing process, but the decoder the attribute transfer is performed only on the points whose position changed by the geometry smoothing process.

The encoder 510, in step 1402, performs occupancy map filtering on the reconstructed geometry. Then in step 1404, the encoder 510 performs the attribute transfer to generate the attribute image. The decoder 550, in step 1410 decodes the attribute image that was generated by the encoder 510 (at step 1404). In step 1412, the decoder 550 performs an occupancy map filtering. Then in step 1414 the decoder 550 assigns the attributes (from the attribute image that was decoded in step 1410) to the extended point cloud. It is noted that the method 1300*b* and 1400*b* are similar.

As described by the methods of FIGS. 8A-14, the smoothed points need to be identified. In certain embodiments, the points which are smoothed are identified in the geometry smoothing process by the output array isBoundaryPoint[n], n=0, . . . , number of points−1. The points which are affected by geometry smoothing are tracked as follows: Initially, isBoundaryPoint[n] is set to 0. Then the boundary identification process is invoked to identify points on or near patch boundaries. For these identified boundary points, isBoundaryPoint[n] is set to 1. Then for a particular boundary point, if the position of the point is replaced by the output from the tri-linear filter in the geometry smoothing process after comparing against the geometry smoothing threshold, the value of isBoundaryPoint[n] is set to 2. In other embodiments instead of 0, 1 and 2, different values could be used to track whether a point is a boundary point and whether it has been geometry-smoothed. Syntax (2), below, describes how to identify the points which are smoothed during geometry smoothing process. With respect to Syntax (2), the array isBoundaryPoint[n], n=0, pointCnt−1, is initialized to 0. An array recPcGeoSmoothed[n], n=0, pointCnt−1, using the array recPcGeo[n], n=0, pointCnt−1. For each reconstructed point with index n, n=0 . . . pointCnt−1, the following applies: if oFrame[y][x] is not equal to 0 and isBoundaryPoint[n] is equal to 0, clause 9.6.5 is invoked with oFrame, PointToPixel[n][0], and PointToPixel[n][1] as inputs. The output is assigned to isBoundaryPoint[n]. It is noted that the value of isBoundaryPoint[n] is set to 2 if the point is smoothed. Instead of using a value of 2 for isBoundaryPoint[n] when the position of the point changes due to smoothing, a separate array isModifiedPoint[n] or isUpdatedPoint[n] may be used to denote whether the point is smoothed.

```
Syntax                                          (2)
sqrNorm = 0
for( k = 0; k < 3; k++ ) {
    diff = recPcGeo[ n ][ k ] * cnt − centroid[ k ]
    sqrNorm += diff * diff
}
dist2 = sqrNorm , cnt + 0.5
if( dist2 >= Max( geoSmoothingThreshold, cnt ) * 2 ) {
    for( k = 0; k < 3; k++ )
        recPcGeoSmoothed[ n ][ k ] = Rnd( centroid[ k ] , cnt )
    isBoundaryPoint[ n ] = 2
}
```

Although FIGS. 8A-14 illustrates an example methods and diagrams, various changes may be made to FIG. 8A-14. For example, while the flowcharts are shown as a series of steps, various steps, could overlap, occur in parallel, occur in a different order, or occur multiple times. In another example, steps may be omitted or replaced by other steps.

Figure 15:
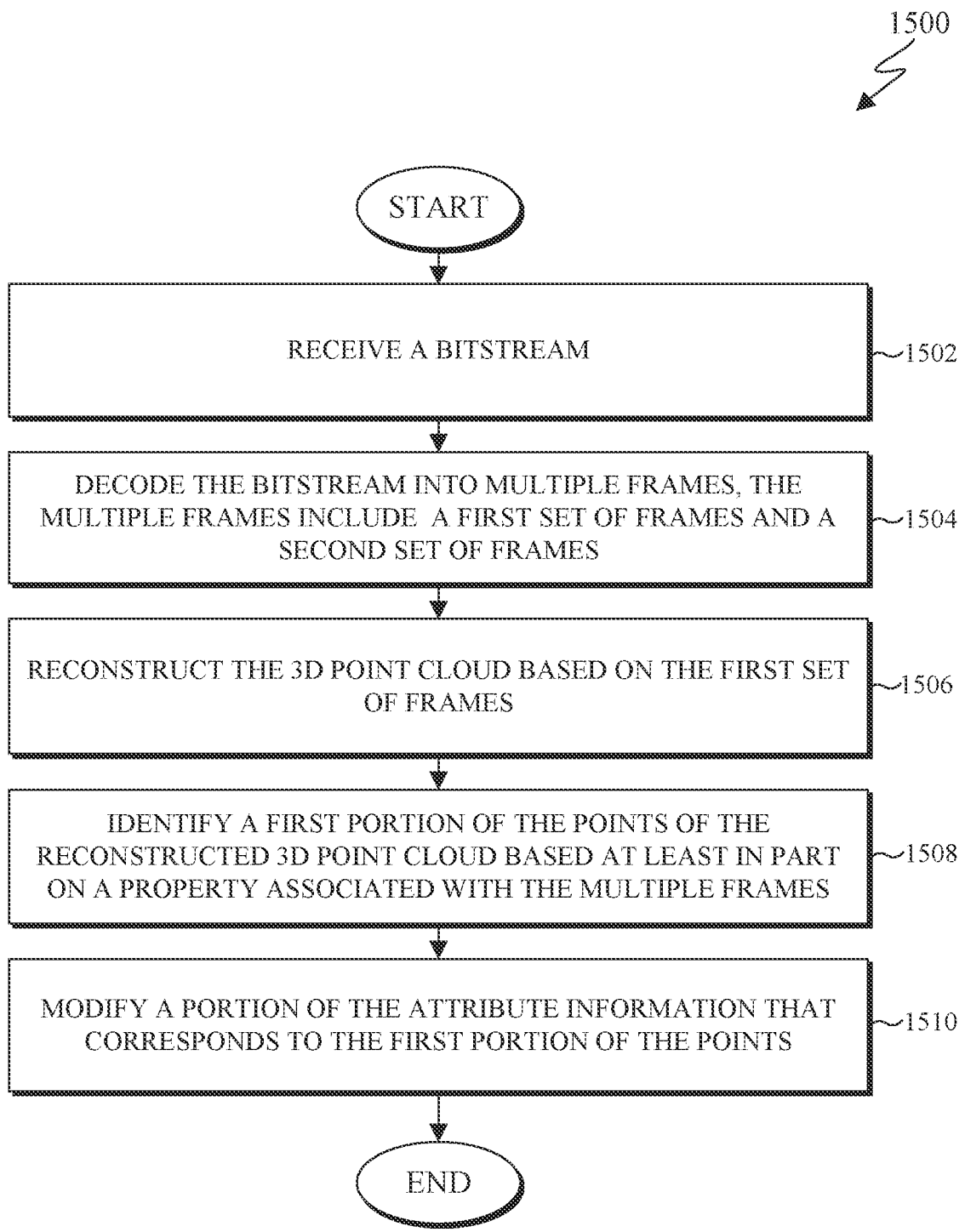
FIG. 15 illustrates an example method for decoding a point cloud in accordance with an embodiment of this disclosure.

FIG. 15 illustrates an example method 1500 for decoding a point cloud in accordance with an embodiment of this disclosure. The method 1500 can be performed by the server 104 or any of the client devices 106-116 of FIG. 1, the server 200 of FIG. 2, the electronic device 300 of FIG. 3, the decoder 550 of FIGS. 5A and 5C or any other suitable device or system.

The method 1500 begins with the decoder, such as decoder 550, receiving a compressed bitstream (step 1502). The received bitstream can include an encoded point cloud that was mapped onto multiple 2-D frames, compressed, and then transmitted and ultimately received by the decoder 550.

In step 1504, the decoder 550 decodes multiple frames from the bitstream. The multiple frames are composed of pixels. In certain embodiments, a portion of the pixels within a frame are organized into patches that correspond to clusters of points of the 3D point cloud. The multiple frames can include a first set of frames and a second set of frames. The first set of frames can represent locations of the points of the 3D point cloud and referred to as geometry frames, while the second set of frames, can represent attribute information for the points of the and referred to as attribute frames.

For example, the geometry frame includes pixels and a portion of the pixels of the geometry frame represent geometric locations of points of the 3D point cloud. The pixels of the geometry frame that are organized into patches corresponding to respective clusters of the points of the 3D point cloud. Similarly, the attribute frame includes pixels and a portion of the pixels of the attribute frame represent attribute information of the points of the 3D point cloud, and a position of the pixels in the attribute frame correspond to a respective position of the pixels in the geometry frame. It is noted that the attribute frames can be based on the reconstructed geometry or the smoothed geometry.

In step 1506, the decoder 550 reconstructs the 3D point cloud. For example, the decoder 550 positions the multiple points in 3D space. The decoder 550 can use the geometry frames and corresponding occupancy map frames to reconstructs the 3D point cloud.

In step 1508, the decoder 550 identifies a first portion of points of the reconstructs the 3D point cloud (of step 1506). The decoder 550 identifies the first portion of points of the reconstructs the 3D point cloud based at least in part on a property that is associated with the frames. In certain embodiments, the property provides an indication as to how the encoder 510 generated the attribute frames. For example, the property can indicate whether the encoder 510, which generated the bitstream, generated the attribute frames based on smoothed geometry or reconstructed geometry. In certain embodiments, the property provides an indication as to whether an encoder (such as the encoder 510 of FIGS. 5A and 5B), which generated the bitstream, performed geometry smoothing to the first set of frames prior to the second set of frames being generated.

In certain embodiments, the property is based on a value of a syntax element. The syntax element can be similar to the syntax element 536*a* generated by the syntax generator 536 of FIG. 5B. The syntax element can provide an indication as to whether the decoder 550 is to modify the portion of the attribute information when the value of the syntax element is a first value or not modify the portion of the attribute information when the value of the syntax element is a second value. The modification can include performing geometry smoothing to the points of the reconstructed point cloud (of step 1506).

For example, the property can provide an indication as to whether the decoder 550 is to perform the geometry smoothing based on the value of the syntax element. When the syntax element provides an indication to not perform geometry smoothing, the decoder 550 applies the attribute information from the second set of frames to the 3D point cloud that is reconstructed based on the first set of frames that represent locations of the points of the 3D point cloud, and then renders the 3D point cloud. Alternatively, when the syntax element provides an indication to perform geometry smoothing, the decoder 550 performs the geometry smoothing to the 3D point cloud that is reconstructed based on the first set of frames and then identifying the first portion of the points.

In order to identify the first portion of the points, the decoder 550 can determine whether geometry smoothing is enabled. Based on a determination that the geometry smoothing is enabled, the decoder 550 performs the geometry smoothing to generate a smoothed 3D point cloud. The decoder 550 then identifies the first portion of the points based on a comparison of the points of the reconstructed 3D point cloud to points of the smoothed 3D point cloud. Based on the comparison of the points of the reconstructed 3D point cloud to the points of the smoothed 3D point cloud the first portion of the points can include shifted points, missing points, added points, and the like.

In step 1510, the decoder 550 modifies a portion of the attribute information that corresponds to the first portion of the points. For example, the decoder 550 applies the modified portion of the attribute information to corresponding points of the smoothed 3D point cloud; and applies an unmodified portion of the attribute information to corresponding points of the smoothed 3D point cloud.

In certain embodiments, to modify the portion of the points of the attribute information, the decoder 550 selects a target point from the first portion of the points of the reconstructed 3D point cloud. The decoder 550 performs a forward search between the smoothed 3D point cloud and the reconstructed 3D point cloud, to identify a first predefined number of points in the reconstructed 3D point cloud that are affected by the geometry smoothing and are closest to the selected target point. The decoder 550 also performs a backward search between the smoothed 3D point cloud and the reconstructed 3D point cloud, to identify a second predefined number of points in the smoothed 3D point cloud and are closest a coordinate associated with the target point. Thereafter, the decoder 550 identifies a weighted average attribute value of the first predefined number of points and the second predefined number of points. The decoder 550 then assigns the weighted average attribute value to the target point.

In certain embodiments, to modify the portion of the points of the attribute information, the decoder 550 generates a first grid that includes a first set of 3D cells, wherein the smoothed 3D point cloud is within the first grid. The decoder 550 also identifies a target cell, of the first set of 3D cells, that include at least one point of the first portion of the points. The decoder 550 generates a second grid that includes a second set of 3D cells, wherein the reconstructed 3D point cloud is within the second grid. The decoder 550 can then perform a K-d tree search in a cell of the second grid that corresponds to the target cell of the first grid to identify a predefined number of points within a distance to a target point in the target cell, wherein the target point is one of the first portion of the points. Thereafter, the decoder 550 identifies a replacement attribute values for the target point based on the identified predefined number of points. It is noted that the replacement attribute value can be based on (i) a color value of a point in the cell of the second grid corresponding to the target cell that is located closest to a location of the target point within the target cell (ii) a weighted average of color values of the identified predefined number of points (iii) a median value from color values of the identified predefined number of points, or the like.

After modifying a portion of the attribute information that corresponds to the first portion of the points (of step 1510), the decoder 550 can perform attribute smoothing, to smooth the values (or colors) of the attributes applied to the reconstructed 3D point cloud. The decoder 550 can also render the 3D point cloud for display.

Although FIG. 15 illustrates example methods and diagrams, various changes may be made to FIG. 15. For example, while shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A decoding device for point cloud decoding, the decoding device comprising:
 a communication interface configured to receive a bitstream; and
 a processor operably coupled to the communication interface, wherein the processor is configured to:
  convert the bitstream into multiple 2D representations, wherein the 2D representations include: (i) geometry frames that represent locations of points of a 3D point cloud, and (ii) attribute frames that represent attribute information of the points of the 3D point cloud,
  reconstruct the 3D point cloud based on at least the geometry frames and the attribute frames,
  perform a smoothing process on the reconstructed 3D point cloud,
  identify a first set of points of the smoothed 3D point cloud, wherein the first set of points comprises points of the smoothed 3D point cloud whose positions were modified by the smoothing process, identify a second set of points of the smoothed 3D point cloud, wherein the second set of points comprises points of the smoothed 3D point cloud whose positions were not modified by the smoothing process,
modify the attribute information for the first set of points, and
retain the attribute information for the second set of points.

2. The decoding device of claim 1, wherein the processor is further configured to:
identify the first set of points and the second set of points based on a value of a variable, wherein a point of the smoothed 3D point cloud is included in the first set of points when the value of the variable is a first value, and is included in the second set of points when the value of the variable is a second value.

3. The decoding device of claim 1, wherein the processor is further configured to:
identify the first set of points and the second set of points of the smoothed 3D point cloud based on a comparison of a threshold against a variable indicative of a difference between a location of a point of the smoothed 3D point cloud and a location of a corresponding point of the reconstructed 3D point cloud.

4. The decoding device of claim 1, wherein the processor is further configured to:
perform the smoothing process on the reconstructed 3D point cloud in response to the bitstream containing an indication that geometry smoothing is enabled.

5. The decoding device of claim 4, wherein the indication that geometry smoothing is enabled comprises a geometry smoothing SEI message having a syntax element set to a first value.

6. The decoding device of claim 1, wherein to modify the attribute information for the first set of points, the processor is configured to, for a first point in the first set of points:
identify a weighted average attribute value based on a predefined number of points in the reconstructed 3D point cloud that are affected by the smoothing process and are in proximity of the first point; and
assign the weighted average attribute value to the first point.

7. The decoding device of claim 1, wherein to modify the attribute information for the first set of points, the processor is configured to, for a first point in the first set of points:
identify a replacement attribute value for the first point based on a predefined number of points in the reconstructed 3D point cloud that are within a distance to the first point; and
assign the replacement attribute value to the first point.

8. The decoding device of claim 7, wherein the replacement attribute value is identified based on a color value of a point in the predefined number of points that is located closest to a location of the first point.

9. The decoding device of claim 7, wherein the replacement attribute value is identified based on a weighted average of color values of the predefined number of points.

10. The decoding device of claim 7, wherein the replacement attribute value is identified based on a median value from color values of the predefined number of points.

11. A method for point cloud decoding, the method comprising:
receiving a bitstream;
converting the bitstream into multiple 2D representations, wherein the 2D representations include: (i) geometry frames that represent locations of points of a 3D point cloud, and (ii) attribute frames that represent attribute information of the points of the 3D point cloud;
reconstructing the 3D point cloud based on at least the geometry frames and the attribute frames;
performing a smoothing process on the reconstructed 3D point cloud;
identifying a first set of points of the smoothed 3D point cloud, wherein the first set of points comprises points of the smoothed 3D point cloud whose positions were modified by the smoothing process;
identifying a second set of points of the smoothed 3D point cloud, wherein the second set of points comprises points of the smoothed 3D point cloud whose positions were not modified by the smoothing process;
modifying the attribute information for the first set of points; and
retaining the attribute information for the second set of points.

12. The method of claim 11, wherein identifying the first set of points and the second set of points further comprises:
identifying the first set of points and the second set of points based on a value of a variable, wherein a point of the smoothed 3D point cloud is included in the first set of points when the value of the variable is a first value, and is included in the second set of points when the value of the variable is a second value.

13. The method of claim 11, wherein identifying the first set of points and the second set of points further comprises:
identifying the first set of points and the second set of points of the smoothed 3D point cloud based on a comparison of a threshold against a variable indicative of a difference between a location of a point of the smoothed 3D point cloud and a location of the point in the reconstructed 3D point cloud.

14. The method of claim 11, wherein performing the smoothing process further comprises:
performing the smoothing process on the reconstructed 3D point cloud in response to the bitstream containing an indication that geometry smoothing is enabled.

15. The method of claim 14, wherein the indication that geometry smoothing is enabled comprises a geometry smoothing SEI message having a syntax element set to a first value.

16. The method of claim 11, wherein modifying the attribute information for the first set of points further comprises, for a first point in the first set of points:
identifying a weighted average attribute value based on a predefined number of points in the reconstructed 3D point cloud that are affected by the smoothing process and are in proximity of the first point; and
assigning the weighted average attribute value to the first point.

17. The method of claim 11, wherein modifying the attribute information for the first set of points further comprises, for a first point in the first set of points:
identifying a replacement attribute value for the first point based on a predefined number of points in the reconstructed 3D point cloud that are within a distance to the first point; and
assigning the replacement attribute value to the first point.

18. The method of claim 17, wherein the replacement attribute value is identified based on a color value of a point in the predefined number of points that is located closest to a location of the first point.

19. The method of claim 17, wherein the replacement attribute value is identified based on a weighted average of color values of the predefined number of points.

20. The method of claim 17, wherein the replacement attribute value is identified based on a median value from color values of the predefined number of points.

\* \* \* \* \*